US012638907B2

(12) United States Patent
Chebbi et al.

(10) Patent No.: US 12,638,907 B2
(45) Date of Patent: May 26, 2026

(54) ENHANCED DEEP SLEEP OPERATIONS FOR MULTIPLE CHIP SYSTEMS

(71) Applicant: QUALCOMM Incorporated, San Diego, CA (US)

(72) Inventors: Shriharsha Chebbi, Hyderabad (IN); Lakshmi Narayana Panuku, Hyderabad (IN); Joshua Stubbs, Longmont, CO (US); Prashanth Kumar Kakkireni, Bengaluru (IN); Arun Gothekar, Hyderabad (IN); Anirudh Ghayal, Secunderabad (IN); Venkatesh Ravipati, Guntur (IN)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 18/660,192

(22) Filed: May 9, 2024

(65) Prior Publication Data

US 2025/0348129 A1 Nov. 13, 2025

(51) Int. Cl.
*G06F 1/32* (2019.01)
*G06F 1/3234* (2019.01)

(52) U.S. Cl.
CPC .......... *G06F 1/3243* (2013.01); *G06F 1/3275* (2013.01)

(58) Field of Classification Search
CPC .............................. G06F 1/3243; G06F 1/3275
See application file for complete search history.

(56) References Cited

U.S. PATENT DOCUMENTS

| | | | |
|---|---|---|---|
| 2009/0292934 A1* | 11/2009 | Esliger | G06F 1/3203 |
| | | | 713/323 |
| 2016/0019183 A1* | 1/2016 | Thurston | G06F 1/08 |
| | | | 710/106 |
| 2018/0267598 A1 | 9/2018 | Pulivendula et al. | |
| 2020/0058330 A1 | 2/2020 | Chhabra et al. | |
| 2021/0191737 A1* | 6/2021 | Raheja | G06F 1/3268 |
| 2022/0413593 A1 | 12/2022 | Kakkireni et al. | |

OTHER PUBLICATIONS

International Search Report and Written Opinion—PCT/US2025/023909—ISA/EPO—Jul. 30, 2025 (2400552WO).

* cited by examiner

*Primary Examiner* — Stefan Stoynov
(74) *Attorney, Agent, or Firm* — Norton Rose Fulbright US LLP

(57) ABSTRACT

This disclosure provides systems, methods, and devices that support enhanced processing core scheduling schemes. In a first aspect, a system-on-a-chip (SoC) includes at least one processor and at least one memory. The at least one processor is configured to cause the SoC to: receive, at a first deep sleep entity of a first die from a second deep sleep entity of a second die, an indication for the secondary die to enter a deep sleep mode based on a plurality of votes from a plurality of clients of the second die; trigger, by the first deep sleep entity, deep sleep enable logic based on the indication from the secondary die; and trigger, by the first deep sleep entity, a sleep hardening manager deep sleep coordination between dies of the SoC based on the trigger from the first deep sleep entity. Other aspects and features are also claimed and described.

20 Claims, 12 Drawing Sheets

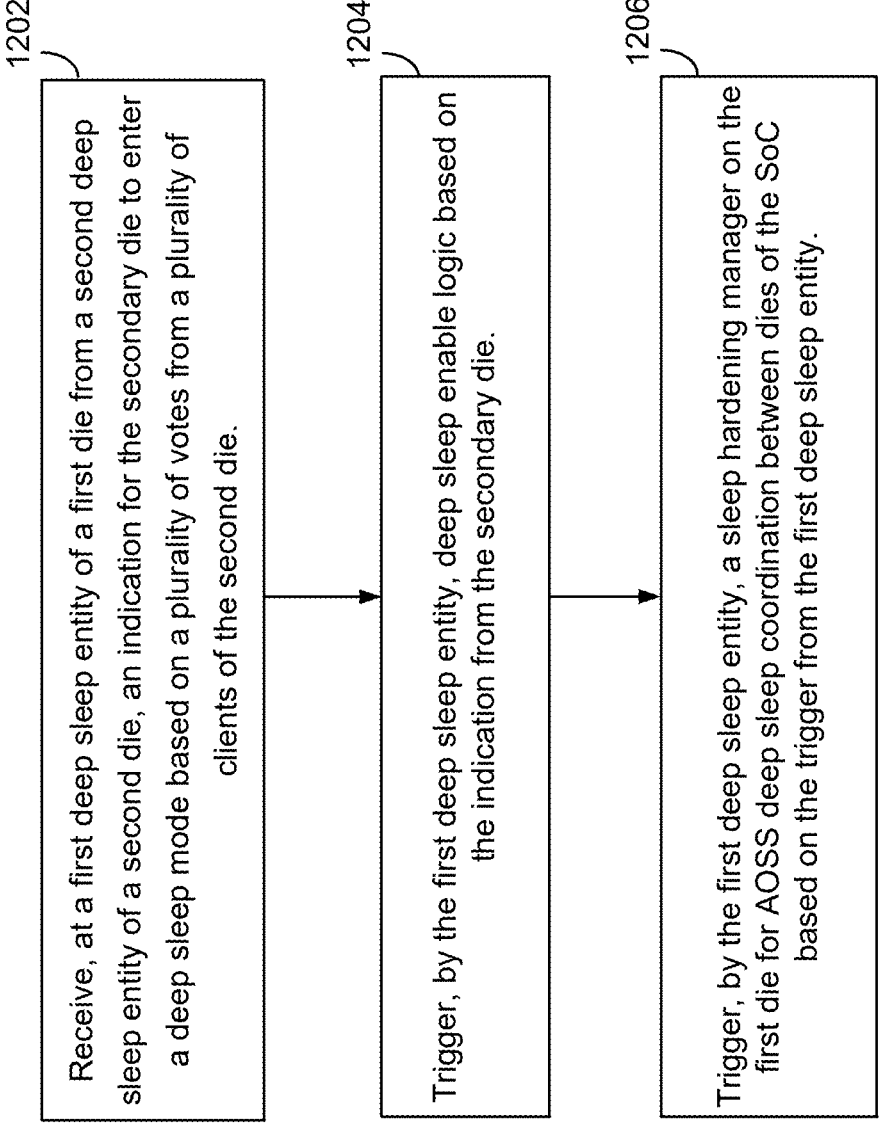

1202

Receive, at a first deep sleep entity of a first die from a second deep sleep entity of a second die, an indication for the secondary die to enter a deep sleep mode based on a plurality of votes from a plurality of clients of the second die.

1204

Trigger, by the first deep sleep entity, deep sleep enable logic based on the indication from the secondary die.

1206

Trigger, by the first deep sleep entity, a sleep hardening manager on the first die for AOSS deep sleep coordination between dies of the SoC based on the trigger from the first deep sleep entity.

ENHANCED DEEP SLEEP OPERATIONS FOR MULTIPLE CHIP SYSTEMS

TECHNICAL FIELD

Aspects of the present disclosure relate generally to an apparatus and method for deep sleep modes. Some aspects may, more particularly, relate to enhanced deep sleep transition operations for multiple chip systems to enable deep sleep coordination over multiple chips of the system.

INTRODUCTION

System-on-a-chip (SoC) designs and mobile devices are becoming more complex, implementing smaller physical profiles with ever-decreasing conductor path dimensions for transferring data at higher rates than predecessor SoCs. Operating at higher speeds with greater physical design constraints may increase power demands.

Mobile devices are capable of running complex software applications and often have multiple wireless access technologies for communicating voice and data using both short-range and long-range wireless systems. With this size reduction and substantial increase in processing power and memory, the power demand for new mobile devices is ever increasing. Additionally, the push for miniaturization drives down the size of batteries to fit in more smaller and complex devices. Thus, battery life and power management are an important aspect to continue to advance mobile innovation.

Several power saving mechanisms have been proposed to extend battery life in mobile devices, such as in single-chip SoCs. One such method that has been implemented is the use of sleep or idle modes in the mobile device. For example, when a device is not currently engaging in wireless communications or not performing processing activities, one or more components of the SoC may be put to sleep to conserve power. However, putting components to sleep requires coordination across multiple components of the SoC, which can create challenges for meeting wake-up demands, such as to quickly restoring power to the components for future operations.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Aspects disclosed herein describe enhanced deep sleep architectures and designs for deep sleep operations for multiple chip SoC architectures. The enhanced deep sleep architectures and designs enable coordination of deep sleep entry and transition operations across multiple chips of a SoC to enable increased functionality and power savings performance. In the aspects described herein, enhanced deep sleep architectures and deep sleep operations for both homogenous and heterogenous multiple chip SoC architectures are described along with the corresponding SoC architecture for such designs.

In one aspect of the disclosure, a system-on-chip (SoC) includes at least one processor and at least one memory coupled to the at least one processor. The at least one processor is configured to cause the SoC to: receive, at a first deep sleep entity of a first die from a second deep sleep entity of a second die, an indication for the secondary die to enter a deep sleep mode based on a plurality of votes from a plurality of clients of the second die; trigger, by the first deep sleep entity, deep sleep enable logic based on the indication from the secondary die; and trigger, by the first deep sleep entity, a sleep hardening manager on the first die for AOSS deep sleep coordination between dies of the SoC based on the trigger from the first deep sleep entity.

In another aspect, method for enhanced deep sleep for a system-on-chip (SoC) includes: receiving, at a first deep sleep entity of a first die from a second deep sleep entity of a second die, an indication for the secondary die to enter a deep sleep mode based on a plurality of votes from a plurality of clients of the second die; triggering, by the first deep sleep entity, deep sleep enable logic based on the indication from the secondary die; and triggering, by the first deep sleep entity, a sleep hardening manager on the first die for AOSS deep sleep coordination between dies of the SoC based on the trigger from the first deep sleep entity.

In an additional aspect, a system-on-chip (SoC) includes at least one processor and at least one coupled to the at least one processor. The at least one processor is configured to cause the SoC to: receive, at a first deep sleep entity of a first die from a second deep sleep entity of a second die, an indication for the secondary die to enter a deep sleep mode based on a plurality of votes from a plurality of clients of the second die; trigger, by the first deep sleep entity, deep sleep enable logic based on the indication from the secondary die; trigger, by the first deep sleep entity, a sleep hardening manager on the first die for AOSS deep sleep coordination between dies of the SoC based on the trigger from the first deep sleep entity; send, by at the sleep hardening manager of the first die to a second sleep hardening manager of the second die, an indication to perform sleep hardening for the second die; receive, at the sleep hardening manager of the first die from the second sleep hardening manager of the second die, an indication of sleep hardening completion for the second die; and send, by the sleep hardening manager to a PMIC of the SoC, a trigger message to perform deep sleep sequence based on receipt of the indication of sleep hardening completion for the second die from the second sleep hardening manager.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 12 is a flow chart illustrating a method for enhanced deep sleep operations for multiple chip SoCs according to some aspects of the disclosure.

Like reference numbers and designations in the various drawings indicate like elements.

DETAILED DESCRIPTION

Figure 1:
FIG. 1 is a block diagram illustrating a system including a computing device according to some aspects of the disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Various aspects will be described in detail with reference to the accompanying drawings. Wherever possible, the same reference numbers will be used throughout the drawings to refer to the same or like parts. References made to particular examples and embodiments are for illustrative purposes and are not intended to limit the scope of the various aspects or the claims.

The term "system-on-a-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), a secure processing unit (SPU), a subsystem processor of specific components of the computing device, such as an image processor for a camera subsystem or a display processor for a display, an auxiliary processor, a single-core processor, a multicore processor, a controller, and a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

As used herein, the term "computing device" refers to any one or all of vehicle management systems, display subsystems, driver assistance systems, vehicle controllers, vehicle system controllers, vehicle communication system, infotainment systems, vehicle display systems or subsystems, vehicle data controllers or routers, cellular telephones, smart phones, personal or mobile multi-media players, personal data assistants (PDAs), laptop computers, personal computers, tablet computers, smart books, palm-top computers, wireless electronic mail receivers, multimedia Internet enabled cellular telephones, vehicle controllers, and similar electronic devices which include a programmable processor and memory and circuitry configured to perform operations as described herein.

For ease of reference, the term "scan chain" is used to refer to a technique used in design for testing (DFT) technologies. Scan chain testing includes techniques that allow an SoC or any other computing device having a processor to selectively activate or use all flip-flops in a scan chain layer of a design as a shift register during scan testing. A scan chain layer may be a physical layer within an SoC inserted into the stack-up of the design layout. The flip flops within a scan chain layer of an SoC are connected to combinational logic that is used to perform various functions of an SoC. A scan chain test may be used to test the functional hierarchies (e.g., CPU, GPU, etc.) of a computing device or SoC. A scan chain may include the serial grouping of a number of flip flops within a circuit design in which each flip flop contains at least two logic gates. In some embodiments, scan chain testing may include shifting data patterns into the SoC in which the flip flops within the scan chain capture the functional data that results from the test pattern, and the results of the input patterns and flip flop data capture is shifted out of the flip flops. This internal scan increases the controllability and observability of SoC logic by connecting storage cells (e.g., flip flops having two or more logic gates) into a long shift register, or scan chain, and by enhancing the logic of these cells to support a scan-shift mode that allows for serial loading and unloading of scan chain contents.

As used herein, the term "scan stitching" refers to the process in logically and/or physically (e.g., electrically) connecting flip flops to create a scan chain. Scan stitching may be implemented in a design process of an SoC or other computing device to map or "chain" together the various flip flops within a chip design. Conventional scan stitching may include serially connecting the flip flops to create a scan chain using a netlist. In some embodiments, scan stitching may be physical-aware scan stitching that orders the flip flops according to their physical location within a chip design, as opposed to using a netlist to create the scan chain. Physical aware scan stitching may include ordering the flip flops in such a way that minimizes the total physical length of the resulting scan chain for purposes of reducing DFT test time. Thermal grid-aware scan stitching refers to the process of grouping and connecting flip flops to create scan chain segments, or sections, based on a logical grid configuration of an SoC.

The term "scan chain section" as used herein refers to one flip flop or a series of flip flops for performing scan chain testing. In some embodiments, a scan chain section may be a reconfigured or redesigned section or portion of a scan chain within a scan chain layer. For example, the scan chain may be reconfigured into multiple standalone scan chain sections during the design phase of a computing device. For example, a pre-fabrication scan chain may be organized via physical-aware scan-stitching, and then separated into scan chain sections (i.e., separate groups of flip flops) that may be activated and tested individually, each section having test data inputs and outputs.

As used herein, the term "flip flop" refers to a circuit that has two stable states and can be used to store state information. A flip flop may include at least two logic gates to perform storage functions. A group of at least two flip flops in a series configuration may be used as a shift register to shift state information bit by bit serially through the flip flops. In some embodiments, a flip flop may be referred to as a latch.

As used herein, the term "spatially" may refer to the physical orientation and/or location of a system component or area within the physical layout and stack-up or a computing device. For example, a group of flip flops may be referred to as being spatially associated with a grid portion of an SoC, where an SoC is logically divided into various portions with respect to the SoC physical layout and/or stack-up. A group of flip flops may be spatially associated with a grid portion such that the group of flips flops may be physically located within the logical boundaries of the grid portion. As another example, a group of flip flops, or a group of logic gates, may be spatially associated with a scan chain section, and therefore the scan chain section may be spatially associated with a corresponding grid portion that is spatially associated with the group of flip flops.

As used herein, the term "grid portion" refers to a physical portion of an SoC in three-dimensional space. For example, a grid portion may be a volume of an SoC fabrication, in which the grid portion is distinct from other grid portions as arranged in a top-down view of the SoC fabrication. A grid portion may include one or more SoC stacks or layers, or a portion of one or more stacks or layers within an SoC. In some embodiments, a grid portion may be referred to as a region of an SoC. In some embodiments, a portion of the SoC may not be a grid portion, but may be a physical portion of the SoC having a defined volume and/or shape distinct from a grid configuration. For example, a portion of the SoC may be dimensionally rectangular, or may be any other shape and volume as determined in a design stage of an SoC. Thus, an SoC may be logically divided into any number of portions, or regions, each having any variety of volumes, such that a single SoC may be logically divided into at least two portions.

Various embodiments include methods, system-on-a-chip (SoC) designs, processing devices, and memory that are configured to implement the methods for monitoring in-field characteristics of an SoC. Various embodiments may be configured to monitor in-field characteristics by implementing a scan chain to sequentially input test data into groups of logic gates corresponding to physical regions of an SoC, and by measuring on-chip thermal, IR drop, and power-grid reliability in response to the scan chain inputting test data.

Continuous and in-field monitoring of on-chip thermal characteristics, IR drop, and power grid reliability is an important safety and security requirement in certain types of systems, processors and SoCs. These in-field characteristics may be especially critical in systems where human safety is a priority, such as automotive vehicle systems. Failure or unexpected degradation (e.g., through excessive IR drop, power grid degradation, electromigration, etc.) of an SoC controlling safety features or other features for normal operation may occur with too little or no warning of an impending failure or error.

Existing sensors, such as temperature and voltage sensors, positioned throughout the physical profile of an SoC can provide read outs of the temperature and voltage values under a given workload. However, execution of a typical workload performing common operations may not exercise remote and discretized logic in the SoC sufficient to enable in-service monitoring of all regions of the SoC. For example, a workload may include functional data patterns activating combinational logic corresponding to a GPU, which may create power demands within a region of the SoC including the GPU for a certain period of time. As another example, a workload may include functional data patterns activating combinational logic corresponding to a CPU, which may create power demands within a different region of the same SoC for a period of time. While any one workload functional pattern is being implemented, the remaining portions of the SoC may be inactive or may not fully utilize the extent of the combinational logic for specific SoC functions. Thus, conventional workloads may not be able to provide rigorous enough power draw (i.e., sufficient temperature conditions) to uncover, or highlight, potential issues within an SoC that may be caused by thermal and electrical conditions. Thus, measuring temperature and voltage values under conventional workloads may not help in isolating and specifically identifying an exact reason for an SoC error or failure (e.g., aged power delivery network, increased IR drop values, on-chip or off-chip power attacks, hard errors, etc.).

Conventional scan chain testing seeks to provide more rigorous testing of an SoC as compared to functional workloads during normal operations. Conventional scan chains typically activate all of the flip flops within a scan chain layer simultaneously, causing all of the associated combinational logic to be activated simultaneously in response. As such, measuring thermal and electrical characteristics during the scan chain activation may provide some insight as to potential overarching issues within an SoC (e.g., thermal "hot spots," power constraints). However, because conventional scan chains are activated in an all-or-nothing manner, conventional scan chains may not allow for identifying specific sources of any observed problems or out-of-limit conditions. For example, activating a conventional scan chain may enable detecting a thermal hot spot; however, the specific circuitry within the SoC causing the thermal issue may not be identifiable based on conventional scan chain activations.

Various embodiments address safety and security considerations through continuous and in-field monitoring of on-chip thermal, power distribution network, and power grid reliability. Various embodiments may identify errors or failures associated with aging of the power grid on the SoC, which over time can lead to in-field functional failures due to poor voltage delivery. Various embodiments may identify trojans or hard attacks, which can cause high power leakage paths or burnouts when a particular logic gate is activated. Various embodiments may further characterize the thermal paths from individual gates to the rest of the SoC to confirm expected operation and no presence of off-chip influences (e.g., a redistribution layer).

Various embodiments include an SoC design particularly suitable for safety and security critical applications. For example, various embodiments may include circuitry, mechanisms, and methods for activating a selected and specific portion of an SoC design while operating in the field. Various embodiments may include circuitry and mechanisms to detect any changes in the SoC power delivery network (or power grid), such as caused by aging or attacks, by capturing the electrical response within the SoC caused by activating a specific design segment within the SoC. As another example, some embodiments may include circuitry and mechanisms to detect changes in the thermal path (i.e., on and off chip) by capturing the thermal response after activating a specific design segment within the SoC. As a further example, some embodiments may include circuitry and mechanisms to detect any trojans or hard fails in the design during in-field operation.

Various embodiments include separating a scan chain design into multiple sections, and clock gating each individual section. Separating a scan chain design into multiple sections may allow for the creation and testing of highly localized, power-dense regions on an SoC. By powering and/or activating each scan chain section separately, sequentially, or in any other configuration, various embodiments enable measuring the thermal and electrical responses present in other unpowered and/or inactive sections within the SoC. This allows in-field testing to isolate potential issues (e.g., aged power delivery network, increased IR drop values, on-chip or off-chip power attacks, hard errors, etc.) based on the responses measured throughout an SoC resulting from each individually activated scan chain section.

In some embodiments, a scan chain may be divided into separate logically located grid sections corresponding to a physical profile of an SoC. For example, during the physical design stage of an SoC, the physical profile of the SoC may be decomposed into a grid having different grid portions. Each grid portion may be logically overlaid on top of the SoC physical profile, such that each logical grid portion may be associated with circuitry within the corresponding physical area of the SoC. Thus, the flip flops of a scan chain layer may be separated similarly based on a grid configuration in which each portion of the grid may be associated with a number of flip flops. The flip flops in each grid may be chained—or stitched—together to create a single scan chain section, or segment, in which each segment may be activated individually to produce and measure a thermal and electrical responses at each other segment of the grid-based scan chain. Thus, thermal grid-aware scan stitching may stitch together flip flops for the purpose of determining thermal characteristics in a grid or grid-like configuration.

The grid-based scan chain segments may be clocked to individually activate each scan chain segment for purposes of measuring the corresponding responses at each other grid portion. For example, a scan chain layer may be designed to include clock gates before and after each portion of the grid (i.e., to isolate each scan chain segment). This allows for the gating of the clock propagation to downstream and upstream logic (i.e., the other flip flops in other portions of the grid and their associated combinational logic). Thus, various embodiments may provide a clock signal to a single group of flip flops associated with a grid portion, while gating the clock signal from other flip flops associated with other grid portions.

After design and tape-out, each clock gate associated with each grid portion may be serially chosen and activated through software to sequentially activate each chain of corresponding flip flops. For example, clocking one grid portion (i.e., the flip flops physically associated with that logical grid portion) may produce responses that are measurable by temperature and voltage sensors in other grid portions that have their clocks gated. Each portion of the grid may be sequentially activated by a clock gate controller to allow the SoC to determine the responses at each clocked-gated grid portion. The temperature and voltage measurements may be used for system characterization to identify potential issues caused by the clocked flip flops associated with an activated grid portion. In some embodiments, the thermal and electrical characteristics of an activated grid portion may be measured individually, or along with other grid portions that have their clocks gated. Thus, a scan-chain grid configuration can enable measuring thermal and electrical responses across any combination of grid portions, clocked or clock-gated, in response to activating any individual grid portion or any combination of grid portions. For example, one grid portion may be activated and thermal and electrical responses may be measured across the activated grid portion, another individual grid portion, multiple different grid portions, or all grid portions simultaneously.

In some embodiments, the clock signaling used to activate each individual grid portion, or scan chain section, may be a high-speed clock signal (e.g., turbo-shifted clock, 3.2 GHZ clock). Shifting the data input into each group of flip flops at high frequencies can cause the SoC to draw power at levels higher than in normal operations (referred to herein sometimes as "high power") to implement the combinational logic associated with each clocked flip flop. By increasing the power requirements for shifting data into the flip flops at high speeds, thermal and electrical responses produced at other sections of the SoC may be more readily measurable, and therefore any associated errors or attacks may be more easily identifiable. Thus, various embodiments enable briefly activating individual grid portions while character- istic measurements (e.g., temperature, voltage, current, etc.) are obtained in other grid portions, and rapidly repeating this process for many or all individual grid portions so that measured characteristics are consistent on average with normal operations (in which many grids are activated) while enabling changes in measurements to be associated with particular one or few grid portions. This capability enables potential performance of life-limiting issues that occur dur- ing normal operation to be detected while at the same time enabling the sources of such issues to be localized to one or a few grid portions.

FIG. 1 illustrates a system including a computing device 10 suitable for use with various embodiments. The comput- ing device 10 may be included in a mobile computing device, such as a wireless communication device, according to one or more aspects of the disclosure. As other examples, the computing device 10 may be included in an MP3 player, a laptop computer, or a non-portable electronic device such as a desktop computer, a game player, a television (TV), a media player, or an automotive computer system. The com- puting device 10 may include an SoC 12 with a processor 14, a memory 16, a communication interface 18, a storage memory interface 20, and sensors 28. The computing device 10 may further include a communication component 22, such as a wired or wireless modem, a storage memory 24, and an antenna 26 for establishing a wireless communication link. The processor 14 may include any of a variety of processing devices, for example a number of processor cores.

An SoC 12 may include one or more processors 14. The computing device 10 may include more than one SoC 12, thereby increasing the number of processors 14 and proces- sor cores. The computing device 10 may also include processors 14 that are not associated with an SoC 12. Individual processors 14 may be multicore processors. The processors 14 may each be configured for specific purposes that may be the same as or different from other processors 14 of the computing device 10. One or more of the proces- sors 14 and processor cores of the same or different con- figurations may be grouped together. A group of processors 14 or processor cores may be referred to as a multi-processor cluster. The processors 14 may control the general opera- tions of SoC 12 and optionally the specific actions of any of the components thereof. The processors 14 may be imple- mented, for example, with a microprocessor or a central processing unit (CPU), or an application-specific integrated circuit (ASIC).

The memory 16 of the SoC 12 may be a volatile or non-volatile memory configured for storing data and pro- cessor-executable code for access by the processor 14. The computing device 10 and/or SoC 12 may include one or more memories 16 configured for various purposes. One or more memories 16 may include volatile memories such as random access memory (RAM) or main memory, or cache memory. As illustrative examples of volatile memories, the one or more memories 16 may include a dynamic random access memory (DRAM) and a static random access memory (SRAM), or a non-volatile memory device, such as a read only memory (ROM), a programmable ROM (PROM), an erasable programmable ROM (EPROM), an electrically erasable programmable ROM (EEPROM), a ferroelectric random access memory (FRAM), a phase- change RAM (PRAM), a magnetoresistive RAM (MRAM), a resistive RAM (SCRAM), or a NAND flash memory. These memories 16 may be configured to temporarily hold a limited amount of data received from a data sensor or subsystem, data and/or processor-executable code instruc- tions that are requested from non-volatile memory, loaded to the memories 16 from non-volatile memory in anticipation of future access based on a variety of factors, and/or intermediary processing data and/or processor-executable code instructions produced by the processor 14 and tempo- rarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor- executable code loaded to the memory 16 may be loaded in response to execution of a function by the processor 14. Loading the data or processor-executable code to the memory 16 in response to execution of a function may result from a memory access request to the memory 16 that is unsuccessful, or a "miss," because the requested data or processor-executable code is not located in the memory 16. In response to a miss, a memory access request to another memory 16 or storage memory 24 may be made to load the requested data or processor-executable code from the other memory 16 or storage memory 24 to the memory 16. Loading the data or processor-executable code to the memory 16 in response to execution of a function may result from a memory access request to another memory 16 or storage memory 24, and the data or processor-executable code may be loaded to the memory 16 for later access.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-execut- able code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24. The storage memory interface 20 may include or correspond to a solid state drive (SSD), a multimedia card (MMC), an embedded MMC (eMMC), a reduced size MMC (RS- MMC), a micro-MMC, a secure digital (SD) card, a mini- SD, a micro-SD, a universal serial bus (USB) storage device, a universal flash storage (UFS) device, a compact flash (CF) card, a smart media (SM) card, or a memory stick.

The sensors 28 may be communicatively coupled to the processor 14, the memory 16, the communication interface 18, and the storage memory 20 via a bus or other communication link. The sensors 28 may include thermal sensors and/or voltage sensors physically located within the SoC 12. The sensors 28 may measure thermal and electrical characteristics (e.g., temperature and voltage values) throughout the SoC 12 during testing and normal operating procedures as described by embodiments. Temperature values and voltage values measured by the sensors 28 may be conveyed to the processor 14 for processing, stored in the memory 16, and/or conveyed from the SoC 12 through the communication interface 18 to other components in the computing device 10.

Some or all of the components of the computing device 10 and/or the SoC 12 may be arranged differently and/or combined while still serving the functions of the various embodiments. The computing device 10 may not be limited to one of each of the components, and multiple instances of each component may be included in various configurations of the computing device 10. For example, the communication interface 18 may be used to convey measured in-field characteristics to the communication component 22. The communication component 22 may relay the measured in-field characteristics to external additional computing devices for purposes of diagnosing any errors based on the in-field characteristics. Similarly, the memory 16, storage memory interface 20, and storage memory 24 may store and convey the measured in-field characteristics and other associated data as according to the various embodiments.

In the aspects described herein, a deep sleep mode or deep sleep state corresponds to a sleep state where memory, such as double data rate (DDR) memory, of the SoC is in a self-refresh state and all other SoC power rails are off (e.g., in a powered down state/disconnected from power supply). In some such implementations, a logic rail (e.g., LX or CX rails) may be off, a crystal oscillator (XO) rail (e.g., XO rail) may be off, and a memory rail (e.g., MX rail) may be off. In some other implementations, the memory rail may be at retention level for DDR self-refresh. In some aspects, the deep sleep state corresponds to a sleep state that is deeper than a rock bottom sleep (RBS) state and has a quick boot wakeup ability and DDR memory retention. The deep sleep state may extend to all component or subsystems of the SoC, such as always-on subsystems (AOSS). For example, in a particular aspect, the quick boot wakeup of the deep sleep state from PMIC boot includes early Audio operations within 700 msec, display within 700 msec, and camera within 1200 msec from PMIC boot. The RBS may be a low power mode for the SoC such that it is non-functional, but that the state of the SoC is retained for "immediate" return to operation once clocks and voltages are restored.

Figure 2:
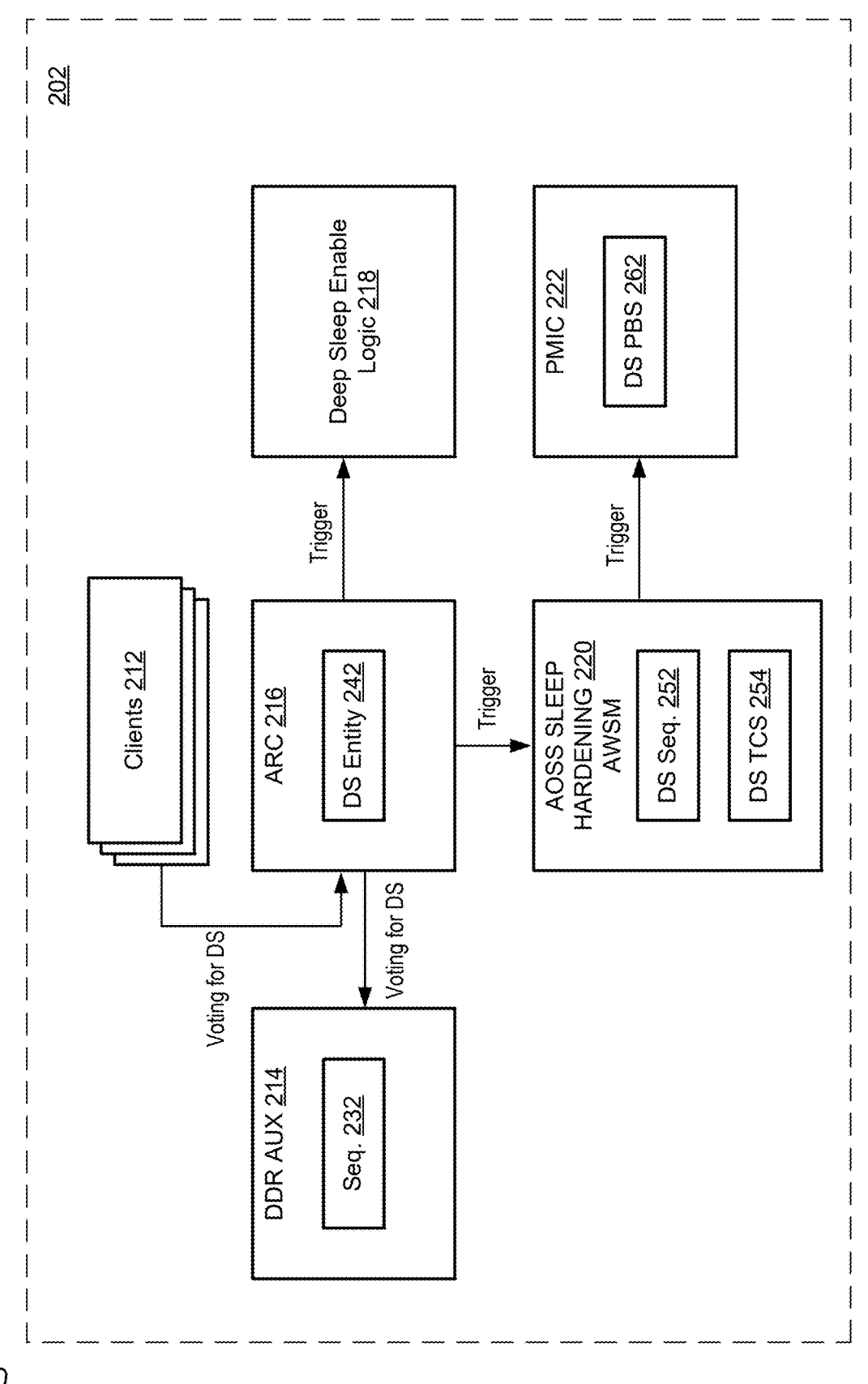
FIG. 2 is a block diagram illustrating an example of a deep sleep architecture for a single die according to some aspects of the disclosure.

FIG. 2 is a block diagram 200 illustrating an example of deep sleep architecture for a circuit or system, such as the SoC of FIG. 1 and/or any components thereof. In FIG. 2, the deep sleep architecture is located on a single die, tile, or chiplet of the circuit or system. For example, a chiplet or die of the system or circuit includes deep sleep logic to enter the components or subsystems on the chiplet or die into a deep sleep mode or state.

In the example of FIG. 2, the circuit architecture of the SoC 202 includes a plurality of clients 212, a DDR AUX 214, an Aggregated Resource Controller (ARC) 216, deep sleep enable logic 218, AOSS sleep hardening logic 220, and a power management integrate controller (PMIC) 222.

The plurality of clients 212 includes a plurality of requesting services or components of the SoC 202. Exemplary clients may include components of subsystems of the SoC 202, applications or services supported by the SoC 202, or a combination thereof. As illustrative, non-limiting examples of clients, the clients may include one or more of applications running a HLOS (e.g., Linux, Android, Windows), a modem, audio components, a GPU, a display, a neural processor, security components, etc. Each client of the plurality of clients 212 is configured to determine whether or not they are able to, or want to, enter a lower power state or sleep mode, such as deep sleep. The plurality of clients 212 is configured to vote or otherwise indicate to the SoC 202, such as to the ARC 216, that they wish or are able to enter a low power or sleep state, such as a deep sleep mode or state.

The DDR AUX 214 includes or corresponds to a DDR memory manager or controller. For example, the DDR AUX 214 is configured to control and coordinate transition of a DDR memory and DDR memory controller. The DDR AUX 214 may be configured to control performance and power states of the DDR memory (not shown) of the SoC 202.

The DDR AUX 214 may include a sequencer 232. The sequencer 232 may include or correspond to a finite state machine (FSM), a microcontroller with firmware, a programmable FSM, or a logical sequence or series of steps for coordinating one or more transitions of the DDR memory.

The DDR AUX 214, such as the sequencer 232 thereof, is configured to vote or otherwise indicate to the SoC 202, such as to the DS ARC 216, that the DDR memory is in or is able to enter a low power or sleep state, such as a refresh state or mode.

The ARC 216 (e.g., a deep sleep ARC (DS ARC)) is communicatively coupled to the plurality of clients 212 and the DDR AUX 214. For example, the ARC 216 is configured to send and receive messages with each of the plurality of clients 212 and the DDR AUX 214.

The ARC 216 may include or correspond to a container for coordinating the transition of various SoC resources, such as physical resources and/or logical resources. Examples of physical resources include voltage domain resources, clock domain resources, transitions between performance states or on/off, etc., and examples of logical resources include logical state resources, such as DDR power states, SoC power states, etc.

The ARC 216 may include a deep sleep entity 242 (aka DS entity). The deep sleep entity 242 may include or correspond to a finite state machine (FSM), a microcontroller with firmware, a programmable FSM, or a logical sequence or series of steps for coordinating a transition to the deep sleep mode.

The ARC 216, such as the deep sleep entity 242 thereof, may be configured to determine whether to transition to a deep sleep state based on input from components of the SoC 202. For example, the deep sleep entity 242 may receive indications, such as votes, from the DDR AUX 214 and/or clients of the plurality of clients 212 which indicate the components/clients of the SoC 202 are ready for or wish to transition to a deep sleep state.

The deep sleep enable logic 218 is configured to control and perform deep sleep enable operations. For example, the deep sleep enable logic 218 may include or corresponds to a controller or command set and is configured to do prepare components for entering sleep or retaining or saving a state thereof. For example, the deep sleep enable operations may be configured to control or coordinate clamping and/or isolation of the signals from the SoC Memory Controller to the corresponding DDR memory connected to the associated memory controller such that while the SoC voltage domains are put into an "Off" state that these signals do not have glitches or changes to them such that the DDR memory would try to exit a self-refresh mode or state. To illustrate, the deep sleep enable operations may be configured to latch or isolate various signals between the DDR Memory Controller and the DDR memory itself such that the DDR memory will stay in the self refresh/low power mode, such that deep sleep is sleep while the SoC voltage domains, clock, etc. are turned off/disconnected. In some implementations, without the deep sleep enable logic making sure these signals did not change state, it could be possible for the DDR memory to inadvertently exit this mode early which is likely to corrupt the data to be retained in the DDR memory.

The AOSS sleep hardening logic 220 includes or corresponds to a state manager for components of the SoC. For example, the AOSS sleep hardening logic 220 may include or correspond to a wake/sleep manager, such as an AOSS sleep hardening wake/sleep manager (AWSM). The AOSS sleep hardening logic 220 is configured to prepare (e.g., harden) components of the SoC 202 for transition to deep sleep. To illustrate, the AOSS sleep hardening logic 220 may prepare clients and components for being disconnected from power.

The AOSS sleep hardening logic 220 may be implemented by dedicated hardware (e.g., circuitry), a microcontroller, software running on a processor, or a combination thereof. The AOSS sleep hardening logic 220 is configured to be independent from and not have a dependency on DDR memory to function. To illustrate, if the AOSS sleep hardening logic 220 is or includes a processor, then the AOSS sleep hardening logic 220 includes its own dedicated storage separate from the DDR memory, such as on-die RAM or NOR flash memory.

The AOSS sleep hardening logic 220 may include a deep sleep sequencer (DS Seq.) 252 and a DS TCS 254. The deep sleep sequencer (DS Seq.) 252 may include or correspond to a finite state machine (FSM), a microcontroller with firmware, a programmable FSM, or a logical sequence or series of steps for preparing clients and/or components for deep sleep. The DS TCS 254 may include or correspond to a deep sleep triggered command set. The DS TCS 254 may be configured to determine which SoC voltage rails (e.g., logic and/or crystal oscillator power rails), clocks, etc. are to be turned off or disconnected. The DS TCS 254 may trigger these resources to be turned off and optionally coordinate with the PMIC 222 to turn these off. In some implementations, the DS TCS 254 is a programmable command set rather than a fixed or hardware configured command set. Alternatively, in other implementations, the SoC of FIG. 2 may not include a DS TCS 254, and rather the PMIC 222, such as the DS PBS 262 thereof, performs these actions in such implementations.

In some implementations, the AOSS sleep hardening logic 220, including any components thereof, is a dedicated entity of the SoC 202 separate from the other entities or components of the SoC 202, such separate from the plurality of clients 212, the DDR AUX 214, the ARC 216, the deep sleep enable logic 218, or the PMIC 222. In other implementations, the AOSS sleep hardening logic 220 could be combined with one or more of the other components of the SoC 202, such as combined with one or more of the DDR AUX 214, the ARC 216, the deep sleep enable logic 218, or the PMIC 222.

The PMIC 222 includes or corresponds to circuitry configured to control power delivery throughout the SoC 202. The PMIC 222 is configured to provide power to clients and components of the SoC 202 and to implement power states of the SoC 202. For example, the PMIC is configured to control operation of one or more power rails of the SoC 202, such as a logic power rail, a memory power rail, a crystal oscillator power rail, etc., and control of the power rails may include switching between configurations of the power rails of the SoC 202 and/or of circuitry of the PMIC 222, which may be associated with particular power modes, such as on, low power, sleep, RBS, deep sleep, etc. The PMIC 222 is also configured to power off the AOSS sleep hardening logic 220.

The PMIC 222 may include a deep sleep programable boot sequence (DS PBS) 262. The DS PBS 262 may include or correspond to a logical sequence or series of steps for collapsing power rails and transitioning the SoC 202 to the deep sleep state. The PMIC 222, such as the DS PBS 262, may be triggered by the AOSS sleep hardening logic 220 and/or the ARC 216.

Although the DDR AUX 214, the ARC 216, and the AOSS sleep hardening logic 220 are illustrated as separate components, in some implementations, two or more of the DDR AUX 214, the ARC 216, and the AOSS sleep hardening logic 220 are unitary or part of the same component. Each of the DDR AUX 214, the ARC 216, and the AOSS sleep hardening logic 220 may be referred to generally as deep sleep logic.

The sequencer 232, the deep sleep entity 242, the DS sequencer 252, and the DS TCS 254 may each include or correspond to local resources of the deep sleep logic, and/or the SoC 202. The DS PBS 262 of the PMIC 222 may include or correspond to a non-local resource of the deep sleep logic, and/or the SoC 202, such as a backend resource.

During operation, the SoC 202 determines to enter a deep sleep state based on inputs from the plurality of clients 212 and from the DDR AUX 214. For example, clients of the plurality of clients 212 send votes to the deep sleep entity 242 of the ARC 216 for aggregation. The votes may indicate the clients are able to transition to the deep sleep state or to the suspend to RAM mode.

Additionally, the DDR AUX 214 sends a vote to the deep sleep entity 242 of the ARC 216 indicating that the DDR memory is in or capable of transitioning to the low-power or self-refresh mode or suspend to RAM mode.

The ARC 216, such as the deep sleep entity 242 thereof, determines whether to transition to the deep sleep mode based on the received votes from the plurality of clients and from the DDR AUX 214. Responsive to determining to transition to the deep sleep mode, the ARC 216, such as the deep sleep entity 242 thereof, sends a trigger message to the deep sleep enable logic 218, to the AOSS sleep hardening logic 220, or both. For example, the deep sleep entity 242 transmits a deep sleep enable logic trigger message to the deep sleep enable logic 218 to trigger performance of deep sleep enable operations by the deep sleep enable logic 218. The deep sleep enable operations may include latching/ isolating signals to the DDR memory such that the state (self-refresh mode or state) that supports deep sleep is not corrupted when the SoC is turned "off". Additionally, or alternatively, the deep sleep entity 242 transmits a deep sleep branch event trigger message to the AOSS sleep hardening logic 220 to trigger performance of deep sleep hardening operations by the AOSS sleep hardening logic 220 and transition to the deep sleep state.

The AOSS sleep hardening logic 220 may perform sleep hardening operations responsive to and optionally based on receiving the deep sleep branch event trigger message from the ARC 216. For example, the AOSS sleep hardening logic 220 may prepare the plurality of clients 212 and/or subsystems of the SoC for deep sleep, such as to be disconnected from power and to suspend their operations and data to RAM.

Transition to the deep sleep state may include or correspond to performance of the DS PBS 262 by the PMIC 222 responsive to triggering by the AOSS sleep hardening logic 220.

Figures 3A, 3B, 3C, 3D:
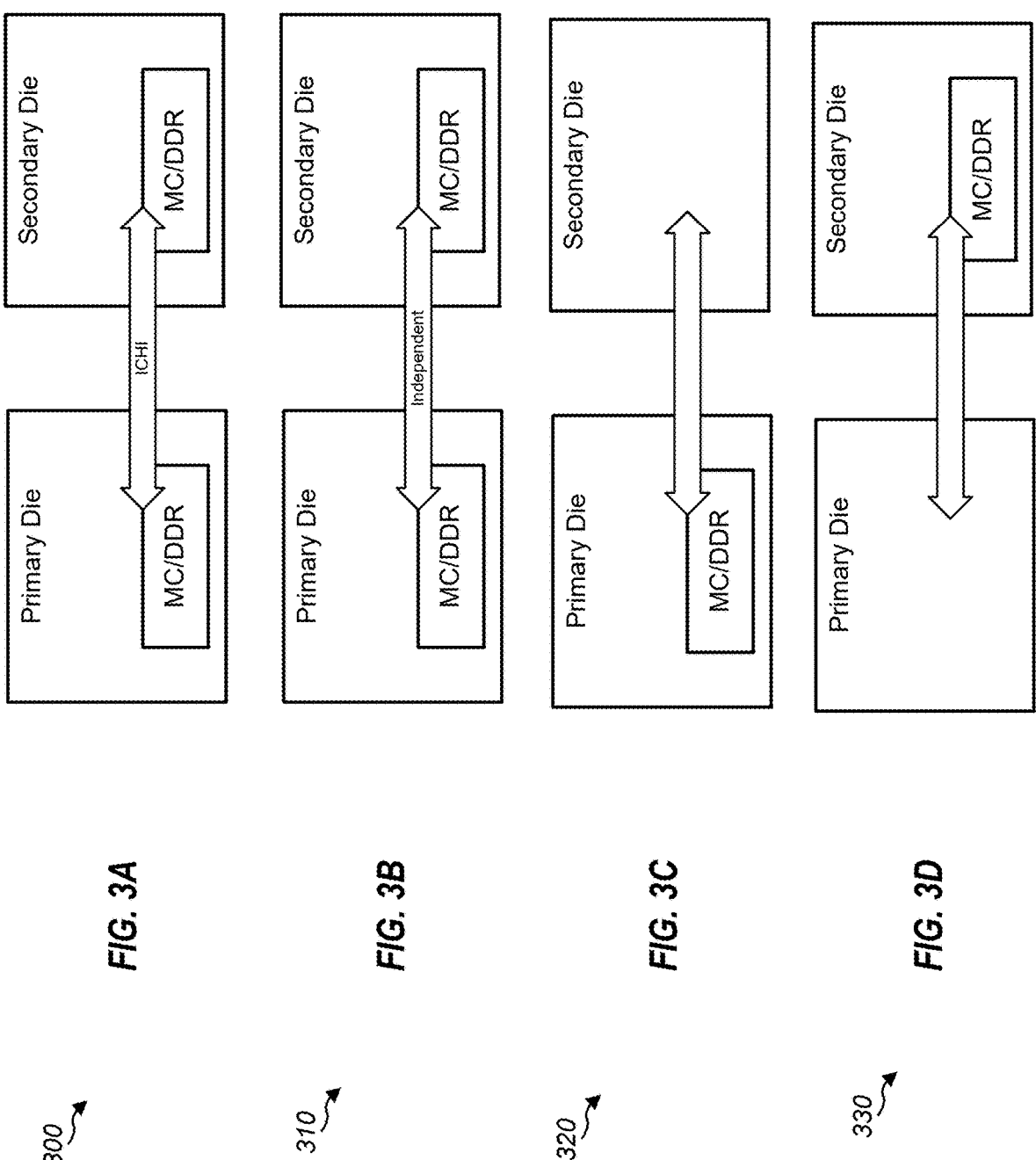
FIGS. 3A-3D are each a block diagram illustrating an example of a system-on-chip (SoC) architecture according to some aspects of the disclosure.

FIGS. 3A-3D are block diagrams illustrating examples of SoC architecture for the enhanced deep sleep operations described herein. FIGS. 3A and 3B are examples of SoC architectures with Homogenous Chiplets, and FIGS. 3C and 3D are examples of SoC architectures with Heterogenous Chiplets. SoC architectures with Homogenous Chiplets include multiple identical chiplets (or dies) with the same components or subsystems (SSs). For example, each chiplet or die of the SoC may have the exact same subsystems and IPs, and such components may be arranged or positioned the same or similar. Conversely, SoC architectures with Heterogenous Chiplets include one or more individual chiplets that are unlike each other with respect to subsystems and IPs. For example, the SoC may include a primary die or chiplet that has subsystems or IPs that may not be present in at least one other chiplet of the SoC. As used herein, the terms of die and chiplet may be one and the same and refer to the same processor or IC that is a discrete part or portion of the SoC. For example, the primary chiplet may include or correspond to a primary die or vice versa.

Different types of SoCs, such as with different chiplet configurations may have different subsystem arrangements, such as memory arrangements (e.g., DDR arrangements). For example, FIG. 3A is an example of an SoC architecture with Homogenous Chiplets and an Inter Chiplet Hardware Interleaving (ICHI) DDR configuration, while FIG. 3B is an example of an SoC architecture with Homogenous Chiplets and an Independent DDR chiplet configuration. As another example, FIG. 3C is an example of an SoC architecture with Heterogenous Chiplets and a primary-only DDR configuration, while FIG. 3D is an example of an SoC architecture with Heterogenous Chiplets and a secondary-only DDR chiplet configuration. Although primary-only and secondary-only DDR configurations are shown for SoC architectures with Heterogenous Chiplets, SoC architectures with Heterogenous Chiplets may further include ICHI DDR configurations or interleaved DDR configurations when the multiple chiplets of the SoC have on-chip or on-die DDR.

In FIGS. 3A-3D, block diagrams 300-330 are illustrated that depict chiplets or dies of the SoC and their corresponding memory controllers (MCs) and DDR memories (depicted as DDR for short in FIGS. 3A-3D). In each of the block diagrams 300-330 of FIGS. 3A-3D, primary and secondary chiplets are depicted along with a corresponding MC and DDR if applicable in the configuration.

Referring to FIG. 3A, a block diagram of 300 is depicted that illustrates a corresponding memory configuration of an SoC architecture with Homogenous Chiplets. In FIG. 3A, the memory configuration of the homogeneous chiplet SoC architecture is the ICHI DDR configuration. The ICHI DDR configuration enables chiplet integration across the chiplets or dies, and may enable components on one chiplet to use a DDR memory on another chiplet, by using an interface, such as an Advanced Interface Bus (AIB). In the ICHI DDR configuration, the DDR memories across the dies are interleaved by hardware such that any client of the DDR memories see the DDR memories as a single memory/resource rather than distinct memories/resources. The interleaving is done at a different granularity that allows for dividing use in such a way to balance power and performance. For example, the division of resources could be every 128 bytes or even every 1 gigabyte.

Referring to FIG. 3B, a block diagram of 310 is depicted that illustrates a corresponding memory configuration of an SoC architecture with Homogenous Chiplets. In FIG. 3B, the memory configuration of the homogeneous chiplet SoC architecture is the independent DDR configuration. The independent DDR configuration does not enable chiplet integration across the chiplets or dies for memory access, and the components on each die would utilize the corresponding DDR memory on the chiplet/die. As opposed to the interleaved case, the DDR memory appears to the clients 212 as two separate DDR memories and the clients 212 must indicate which DDR memory they wish to communicate with. It is possible for the clients 212 on primary die to use the secondary DDR memory in some implementations or operational situations.

Referring to FIG. 3C, a block diagram of 320 is depicted that illustrates a corresponding memory configuration of an SoC architecture with heterogenous chiplets. In FIG. 3C, the memory configuration of the heterogenous chiplet SoC architecture is the primary-only DDR configuration. The primary-only DDR configuration has a MC and a DDR memory only on the primary chiplet, and the DDR memory on the primary chiplet may be used for one or more non-primary chiplets of the SoC, such as the secondary chiplet.

Referring to FIG. 3D, a block diagram of 330 is depicted that illustrates a corresponding memory configuration of an SoC architecture with heterogenous chiplets. In FIG. 3D, the memory configuration of the heterogenous chiplet SoC architecture is the secondary-only DDR configuration. The secondary-only DDR configuration has a MC and a DDR memory only on the secondary chiplet, and the DDR memory on the secondary chiplet may be used for one or more chiplets of the SoC, such as the primary chiplet.

FIGS. 4, 6, 8, and 10 correspond to examples of SoC architectures that support enhanced deep sleep operations for/across multiple chiplet SoCs. FIGS. 5, 7, 9, and 11 correspond to examples of deep sleep operations for the example SoC architectures described in FIGS. 4, 6, 8, and 10.

Figure 4:
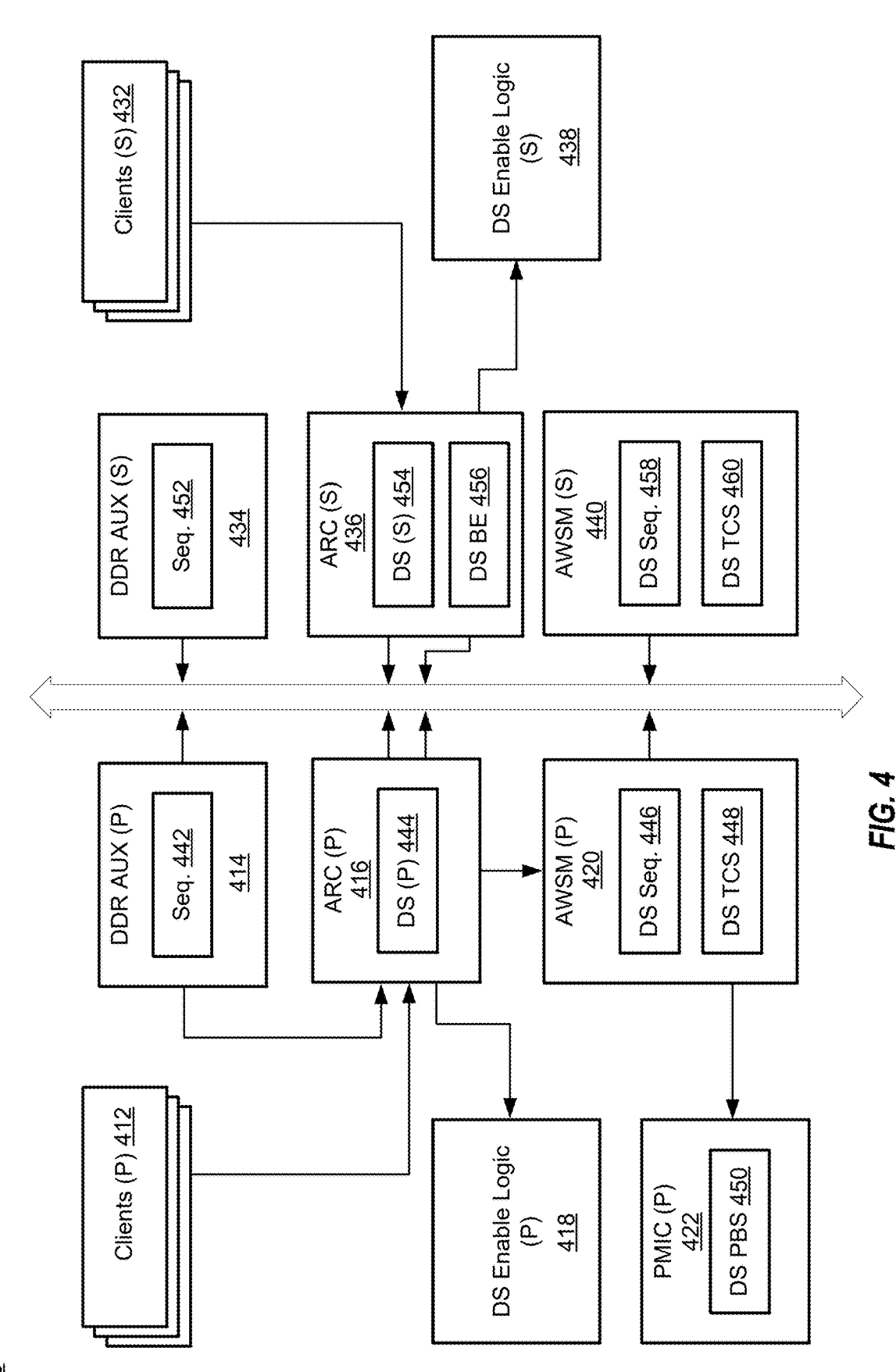
FIG. 4 is a block diagram illustrating an example of an enhanced deep sleep architecture for multiple chip SoCs according to some aspects of the disclosure.

Referring to FIG. 4, FIG. 4 is an example of an SoC architecture with homogenous chiplets and an ICHI DDR configuration. In FIG. 4, an SoC 400 that is configured for enhanced deep sleep operations is illustrated.

The SoC 400 includes multiple chiplet or dies. In the example of FIG. 4, two chiplets and dies are illustrated for simplicity, that is a first chiplet on a first die and a second chiplet on a second die connected to each other via die-to-die (D2D) interface and where the chiplets are the same type, as described with reference to FIG. 3A. In other examples, the SoC 400 may include more chiplets of the same type. In the particular example illustrated in FIG. 4, the SoC 400 includes a primary chiplet on a primary die and a secondary chiplet on a secondary die with the exact same subsystems and components.

The SoC 400 includes similar subsystems and components described with reference to the SoC of FIG. 2. For example, the primary chiplet of the SoC 400 includes a first plurality of clients 412 (clients P), a first DDR AUX 414 (DDR AUX P), a first ARC 416 (ARC P), first deep sleep enable logic 418 (DS enable logic P), first AOSS logic 420 (AWSM P), and a PMIC 422 (PMIC P). The secondary chiplet of the SoC 400 includes a second plurality of clients 432 (clients S), a second DDR AUX 434 (DDR AUX S), a second ARC 436 (ARC S), second deep sleep enable logic 438 (DS enable logic S), and second AOSS logic 440 (AWSM S).

The first plurality of clients 412 (e.g., first clients) may include or correspond to the plurality of clients 212 of FIG. 2. For example, the first plurality of clients 412 includes clients for the primary chiplet of the SoC. The clients may include components or subsystems of the primary chiplet or of the SoC in general, which send requests to and utilize resources of the primary chiplet.

The first plurality of clients 412 may be configured to determine whether or not to vote for a deep sleep mode and to vote for the deep sleep mode. For example, each of the first plurality of clients 412 may send a vote message or indication to the first ARC 416 indicating to enter a deep sleep mode. The first plurality of clients 412 may be configured to determine whether or not to vote for a deep sleep mode based on a state of the client and/or based on one or more conditions, such as resource utilization thresholds. To illustrate, the first plurality of clients 412 may determine to vote for deep sleep based on one more resource utilization metrics being lower than a corresponding resource utilization threshold.

The first DDR AUX 414 (DDR AUX P) may include or correspond to the DDR AUX 214 of FIG. 2. For example, the first DDR AUX 414 includes or corresponds to a DDR memory state manager or controller, and may be configured to control and coordinate transitions between states of a DDR memory and DDR memory controller. The first DDR AUX 414 may be configured to control performance and power states of a first DDR memory and/or memory controller (not shown) of the primary chiplet of the SoC 400.

The first DDR AUX 414 may include a sequencer 442. The sequencer 442 may include or correspond to the sequencer 232 of FIG. 2. For example, the sequencer 442 may include or correspond to a finite state machine (FSM), a microcontroller with firmware, a programmable FSM, or a logical sequence or series of steps for coordinating one or more state transitions of the first DDR memory.

The first DDR AUX 414, such as the sequencer 442 thereof, is configured to vote or otherwise indicate to the SoC 400, such as to the first ARC 416, that the first DDR memory is in or is able to enter a low power or sleep state, such as a refresh state or mode. Additionally, in the example of FIG. 4, the first DDR AUX 414, such as the sequencer 442 thereof, may be further configured to communicate with the second DDR AUX 434 via the D2D interface to coordinate the performance and/or state of the DDR memories across chiplets of the SoC 400. For example, the first DDR AUX 414 may receive and/or request information on a state of the DDR memories of the other chiplets. To illustrate, the first DDR AUX 414 may receive an indication from the second DDR AUX 434 that the second DDR memory is in the self-refresh state, and the first DDR AUX 414 may relay the information or indication to the first ARC 416 (ARC P) to enable the first ARC 416 (ARC P) to determine whether to enter the deep sleep mode.

The first ARC 416 (ARC P) may include or correspond to the ARC 216 of FIG. 2. For example, the first ARC 416 (ARC P) may include or correspond to a container for coordinating the transition of various SoC resources, such as physical resources and/or logical resources. Examples of physical resources include voltage domain resources, clock domain resources, transitions between performance states or on/off, etc., and examples of logical resources include logical state resources, such as DDR power states, SoC power states, etc. To illustrate, the first ARC 416 (ARC P) may receive and aggregate votes from one or more components or systems of the primary chiplet for different states or modes, such as for the deep sleep mode.

The first ARC 416 (ARC P) may include a first deep sleep entity 444 (DS P), and the first deep sleep entity 444 (DS P) may include or correspond to the deep sleep entity 242 of FIG. 2. For example, the first deep sleep entity 444 (DS P) may include or correspond to a finite state machine (FSM), a microcontroller with firmware, a programmable FSM, or a logical sequence or series of steps for coordinating a transition to the deep sleep mode.

The first ARC 416 (ARC P), such as the first deep sleep entity 444 (DS P) thereof, may be configured to determine whether to transition to the deep sleep state based on input from components of the SoC 400. For example, the first deep sleep entity 444 (DS P) may receive indications, such as votes, from the first DDR AUX 414 and/or first clients of the plurality of first clients 412, which indicate the components/clients of the SoC 400 are ready for or wish to transition to the deep sleep state.

Additionally, in the example of FIG. 4, the first ARC 416 (ARC P), such as the first deep sleep entity 444 (DS P) thereof, may be further configured to communicate with the second ARC 436 (ARC S) or the second deep sleep entity 454 (DS S) thereof via the D2D interface to receive aggregated deep sleep voting information from the secondary chiplet. For example, the first ARC 416 (ARC P) may receive and/or request information on a state of the clients of the other chiplets. To illustrate, the first ARC 416 (ARC P) may receive an indication of the aggregated votes or receive the aggregated votes from the secondary chiplet to enable the first ARC 416 (ARC P) to determine whether to enter the deep sleep mode.

The first deep sleep enable logic 418 (DS enable logic P) may include or correspond to the deep sleep enable logic 218 of FIG. 2. For example, the first deep sleep enable logic 418 (DS enable logic P) may include or correspond to logic or circuitry configured to control and perform deep sleep enable operations for components and subsystems of the primary chiplet.

The first AOSS logic 420 (AWSM P) may include or correspond to the AOSS sleep hardening logic 220 of FIG. 2. For example, the first AOSS logic 420 (AWSM P) may include or correspond to a state manager for components of the SoC 400. To illustrate, the first AOSS logic 420 may include or correspond to a wake/sleep manager, such as an AOSS sleep hardening wake/sleep manager (AWSM) that is configured to prepare (e.g., harden) components of the SoC 400 for transition to the deep sleep state. To illustrate, the first AOSS logic 420 (AWSM P) may prepare clients and components of the primary chiplet to be disconnected from power.

The first AOSS logic 420 (AWSM P) may include a first deep sleep sequencer 446 (DS Seq.) and a first DS TCS 448. The first deep sleep sequencer 446 may include or correspond to the DS Seq. 252 of FIG. 2. For example, the first deep sleep sequencer 446 may include or correspond to a finite state machine (FSM), a microcontroller with firmware, a programmable FSM, or a logical sequence or series of steps for preparing clients and/or components for deep sleep. The first DS TCS 448 may include or correspond to the DS TCS 255 of FIG. 2. For example, the first DS TCS 448 may include or correspond to may include or correspond to a deep sleep triggered command set. The first DS TCS 448 may be configured to determine which SoC voltage rails (e.g., logic and/or crystal oscillator power rails), clocks, etc. are to be turned off or disconnected. The first DS TCS 448 may trigger these resources to be turned off and optionally coordinate with the PMIC 422 to turn these off. In some implementations, the first DS TCS 448 is a programmable command set rather than a fixed or hardware configured command set. Alternatively, in other implementations, the SoC 400 may not include the first DS TCS 448, and rather the PMIC 422, such as the DS PBS 450 thereof, performs these actions in such implementations. The first DS TCS 448 on the primary die will perform the disconnection operations for the resources on the primary die that can be done without losing functionality of the first AOSS logic 420 (AWSM P) for the corresponding die.

The first AOSS logic 420 (AWSM P), such as the first deep sleep sequencer 446 thereof, may be further configured to communicate with the second AOSS logic 440 (AWSM S) or the second deep sleep sequencer 458 thereof via the D2D interface to coordinate sleep hardening operations on the secondary chiplet and prepare the second chiplet (and other chiplets) for the transition to the deep sleep state.

The PMIC 422 (PMIC P) may include or correspond to the PMIC 222 of FIG. 2. For example, the PMIC 422 (PMIC P) may include or correspond to circuitry configured to control power delivery throughout the SoC 400, or at least to the components of the SoC 400. To illustrate, the PMIC 422 (PMIC P) is configured to provide power to clients and components of the SoC 400 and to implement power states of the SoC 400. In the example of FIG. 4, the PMIC 422 (PMIC P) is configured to control operation of one or more power rails of the SoC 400, such a logic power rail, a memory power rail, a crystal oscillator power rail, etc., and control of the power rails may include switching between configurations of the power rails of the SoC 400 and/or of circuitry of the PMIC 422 (PMIC P), which may be associated with particular power modes, such as on, low power, sleep, deep sleep, etc.

The PMIC 422 (PMIC P) may include a deep sleep programable boot sequence (DS PBS) 450. The DS PBS 450 may include or correspond to the DS PBS 262 of FIG. 2. For example, the DS PBS 450 may include or correspond to a logical sequence or series of steps for collapsing power rails and transitioning the SoC 202 to the deep sleep state. In some implementations, the DS PBS 450 is configured to collapse or disconnect resources of the SoC 400 that cannot be performed by the first DS TCS 448, such as the resources required for functional operations of the first DS TCS 448 (e.g., AOSS voltage and clock). The PMIC 422 (PMIC P), such as the DS PBS 450, may be triggered by the first AOSS logic 420 (AWSM P) and/or the first ARC 416 (ARC P).

Although the first DDR AUX 414, the first ARC 416 (ARC P), and the first AOSS logic 420 (AWSM P) are illustrated as separate components, in some implementations, two or more of the first DDR AUX 414, the first ARC 416 (ARC P), and the first AOSS logic 420 (AWSM P) are unitary or part of the same component. Each of the first DDR AUX 414, the first ARC 416 (ARC P), and the first AOSS logic 420 (AWSM P) may be referred to generally as deep sleep logic or components, and referred to as an AOSS or AWSM block.

The second plurality of clients 432 (e.g., second clients) may include or correspond to the plurality of clients 212 of FIG. 2 and/or the first plurality of clients 412. For example, the second plurality of clients 432 includes clients for the secondary chiplet of the SoC. The clients may include components or subsystems of the secondary chiplet or of the SoC in general, which send requests to and utilize resources of the secondary chiplet. The second plurality of clients 432 may also be configured to determine whether or not to vote for a deep sleep mode and to vote for the deep sleep mode, as described above with revenge to the first plurality of clients 412. For example, each of the second plurality of clients 432 may send a vote message or indication to the second ARC 436 indicating to enter a deep sleep mode.

The second DDR AUX 434 (DDR AUX S) may include or correspond to DDR AUX 214 of FIG. 2 and/or the first DDR AUX 414 (DDR AUX P), as described above. For example, the second DDR AUX 434 (DDR AUX S) may include or correspond to a DDR memory state manager or controller, and may be configured to control and coordinate transitions between states of a DDR memory and DDR memory controller. The second DDR AUX 434 (DDR AUX S) may be configured to control performance and power states of a second DDR memory and/or memory controller (not shown) of the secondary chiplet of the SoC 400.

The second DDR AUX 434 (DDR AUX S) may include a second sequencer 452. The second sequencer 452 may include or correspond to the sequencer 232 of FIG. 2 or the sequencer 442. The second sequencer 452 may include or correspond to a finite state machine (FSM), a microcontroller with firmware, a programmable FSM, or a logical sequence or series of steps for coordinating one or more state transitions of the second DDR memory.

The second DDR AUX 434, such as the second sequencer 452 thereof, is configured to vote or otherwise indicate to the SoC 400, such as to the second ARC 436, that the second DDR memory is in or is able to enter a low power or sleep state, such as a refresh state or mode.

The second ARC 436 (ARC S) may include or correspond to the ARC 216 of FIG. 2 and/or the first ARC 416 (ARC P), as described above. For example, the second ARC 436 (ARC S) may include or correspond to a container for coordinating the transition of various SoC resources, such as physical resources and/or logical resources. Examples of physical resources include voltage domain resources, clock domain resources, transitions between performance states or on/off, etc., and examples of logical resources include logical state resources, such as DDR power states, SoC power states, etc. To illustrate, the second ARC 436 (ARC S) may receive and aggregate votes from one or more components or systems of the secondary chiplet for different states or modes, such as for the deep sleep mode.

The second ARC 436 (ARC S) may include a second deep sleep entity 454 (DS S) and a deep sleep backend entity 456 (DS BE). The second deep sleep entity 454 (DS S) may include or correspond to the deep sleep entity 242 of FIG. 2 and/or the first deep sleep entity 444 (DS P), as described above. For example, the second deep sleep entity 454 (DS S) may include or correspond to a finite state machine (FSM), a microcontroller with firmware, a programmable FSM, or a logical sequence or series of steps for coordinating a transition to the deep sleep mode. To illustrate, the second deep sleep entity 454 (DS S) may be configured to receive and aggregate votes from the plurality of second clients 432 and provide the aggregated votes or an indication of the aggregated votes to the first deep sleep entity 444 (DS P), to enable the first deep sleep entity 444 (DS P) to determine whether to enter the deep sleep mode.

The deep sleep backend entity 456 (DS BE) may include or correspond to a deep sleep entity configured to communicate with a primary deep sleep entity, such as the first deep sleep entity 444 (DS P), and with a corresponding deep sleep enable logic, such as the second deep sleep enable logic 438 (DS enable logic S). For example, the deep sleep backend entity 456 (DS BE) may include or correspond to a finite state machine (FSM), a microcontroller with firmware, a programmable FSM, or a logical sequence or series of steps for coordinating a transition to the deep sleep mode. To illustrate, the deep sleep backend entity 456 (DS BE) may be configured to receive a trigger indication from the first deep sleep entity 444 (DS P) and relay the trigger indication or provide a trigger indication to the second deep sleep enable logic 438 (DS enable logic S) to trigger deep sleep enable actions for the secondary chiplet and to enable the first deep sleep entity 444 (DS P) to coordinate deep sleep enable operations across chiplets.

The second deep sleep enable logic 438 (DS enable logic S) may include or correspond to the deep sleep enable logic 218 of FIG. 2 and/or the first deep sleep enable logic 418 (DS enable logic P), as described above. The second deep sleep enable logic 438 (DS enable logic S) may include or correspond to logic or circuitry configured to control and perform deep sleep enable operations for components and subsystems of the secondary chiplet.

The second AOSS logic 440 (AWSM S) may include or correspond to the AOSS sleep hardening logic 220 of FIG. 2 and/or the first AOSS logic 420 (AWSM P), as described above. For example, the second AOSS logic 440 (AWSM S) may include or correspond to a state manager for components of the SoC 400. To illustrate, the second AOSS logic 440 (AWSM S) may include or correspond to a wake/sleep manager, such as an AOSS sleep hardening wake/sleep manager (AWSM) that is configured to prepare (e.g., harden) components of the SoC 400 for transition to the deep sleep state. To illustrate, the second AOSS logic 440 (AWSM S) may coordinate with the first AOSS logic 420 (AWSM P) to prepare clients and components of the secondary chiplet to be disconnected from power.

The second AOSS logic 440 (AWSM S) may include a second deep sleep sequencer 458 (DS Seq.) and a second DS TCS 460. The second deep sleep sequencer 458 may include or correspond to the DS Seq. 252 of FIG. 2 and/or the first deep sleep sequencer 446, as described above. For example, the second deep sleep sequencer 458 may include or correspond to a finite state machine (FSM), a microcontroller with firmware, a programmable FSM, or a logical sequence or series of steps for preparing clients and/or components of the secondary chiplet for deep sleep. The second DS TCS 460 may include or correspond to the DS TCS 255 of FIG. 2 and/or the first DS TCS 448, as described above. For example, the second DS TCS 460 may include or correspond to may include or correspond to a deep sleep triggered command set. The second DS TCS 460 may be configured to determine which SoC voltage rails (e.g., logic and/or crystal oscillator power rails), clocks, etc. are to be turned off or disconnected. The second DS TCS 460 may trigger these resources to be turned off and optionally coordinate with the first DS TCS 448 and/or the PMIC 422 to turn these off. In some implementations, the second DS TCS 460 is a programmable command set rather than a fixed or hardware configured command set. Alternatively, in other implementations, the SoC 400 may not include the second DS TCS 460, and rather the PMIC 422, such as the DS PBS 454 thereof, performs these actions in such implementations. The second DS TCS 460 on the secondary die will perform the disconnection operations for the resources on the secondary die that can be done without losing functionality of the secondary AOSS logic 440 (AWSM s) for the corresponding die.

A SOC may have various types of resources, such as local resources, remote resources, and backend resources. Local resources refer to resources that are associated with or considered "local" for a particular die/chiplet. Remote resources refer to resources that may be associated with a particular die/chiplet but are aggregated on another die/chiplet, or remote from the die/chiplet they are sent to or intended for. For example, a "remote" resource may correspond to an aggregator and send resources/information to a master resource.

In some implementations, local resources are those representing a resource that is physically controlled on the same die as the representation of that resource. The local resource will aggregate needs from the local clients and optionally a remote resource. For example, a resource on primary die would aggregate the needs of the plurality of first clients 412.

In some implementations, a remote resource is a resource that is physically controlled on another die. The remote resource provides a mechanism to aggregate needs of the clients on that die. The remote resource might not be present (e.g., optional or optionally used/established) if none of the clients on that die would have votes on the resource on the other die. When present, the remote resource aggregates for the clients on the other die. For example, a remote resource on secondary die would aggregate the needs of the plurality of second clients 432, and then present an aggregated vote to a local resource on the other die, such as the primary die.

Although illustrated for simplicity, local resources could be on a primary, a secondary or any die, and remote resources could also be present on any die type even though the example above only illustrates local resources on the primary die and remote resources on the secondary die.

In some implementations, a backend only resource is a special case of a resource that is physically controlled on the die that the backend is on, but the desired state (power state, performance state) is determined by a local resource or resources on another die. As one example, interleaved DDR configurations (e.g., ICHI) are one illustration of scenarios with backend only resources. With the ICHI configuration, the DDR memories of a multiple dies is presented as a single resource. By convention, the local resource is on the primary and the remote resource is on secondary. However, because the two separate physical resources are presented as one, they transition states together, and the local resource also coordinates with a backend resource on another die to transition the two resources together.

In the example of FIG. 4, the components of the first DDR AUX 414, the first ARC 416, the first AOSS logic 420, and the second AOSS logic 440 may include or correspond to local resources. For example, the first deep sleep entity 444 may include or correspond to a local resource of the primary chiplet/die, and the second deep sleep sequencer 458 may include or correspond to a local resource of the secondary chiplet/die.

Additionally, the components of the second DDR AUX 434 and the second ARC 436 may include or correspond to remote or backend resources. For example, the second deep sleep entity 454 of the second ARC 436 may include or correspond to a remote resource of the primary chiplet/die and located on the secondary chiplet/die. As another example, the second sequencer 452 of the second DDR AUX 434 and the deep sleep backend entity 456 of the second ARC 436 may include or correspond to a backend resource.

Figure 5:
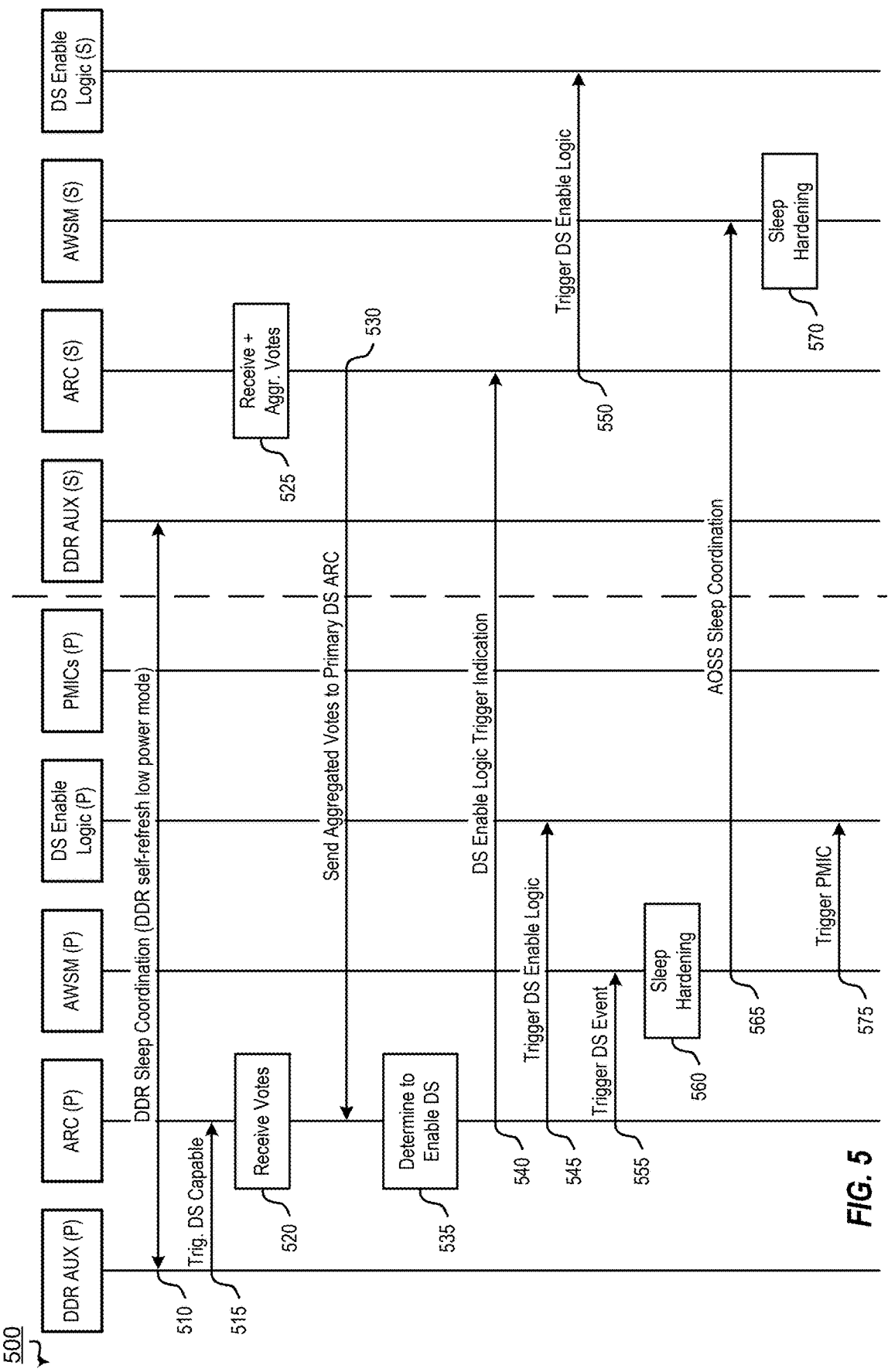
FIG. 5 is a flow diagram illustrating an example of enhanced deep sleep operations for multiple chip SoCs according to some aspects of the disclosure.

The operations of the SoC 400 of FIG. 4 are described with reference to FIG. 5. Referring to FIG. 5, FIG. 5 is an example of enhanced deep sleep operations for an SoC architecture with homogenous chiplets and an ICHI DDR configuration, such as the SoC 400 of FIG. 4. In FIG. 5, a flow diagram of enhanced deep sleep operations is illustrated.

During operation of the SoC, at 510, the primary DDR memory manager (DDR AUX P) and the secondary DDR memory manager (DDR AUX S) perform DDR sleep coordination operations. For example, the primary DDR memory manager (DDR AUX P) and the secondary DDR memory manager (DDR AUX S) exchange messages across the D2D interface to coordinate transitioning their corresponding DDR memories to a low-power or self-refresh mode. The low-power or self-refresh mode of the DDR memory may correspond to state where the DDR memory has transfer, flushed, or placed its currently stored cache data (e.g., LLC) into the DDR memory and the DDR memory is not operating. In the low-power or self-refresh mode, the DDR memory may be receiving only retention power sufficient to sustain memory in the cache storage or may be fully disconnected from power.

The messages may include a synchronization message, a low power ready message, a low power transition or trigger message, a low power state confirmation message, or any combination thereof. To illustrate, as the DDR memories are operating in the ICHI mode, the primary DDR memory manager (DDR AUX P) and the secondary DDR memory manager (DDR AUX S) may coordinate performance of the memory with another so that both DDR memories can transition to the low power state.

At 515, the primary DDR memory manager (DDR AUX P) sends a trigger to the primary deep sleep entity (DS ARC P). For example, the primary DDR memory manager (DDR AUX P) sends a trigger message or indication to the primary deep sleep entity (DS ARC P) indicating that the corresponding DDR memories of the SoC (e.g., at least the primary and secondary DDR memories) are in the low-power or self-refresh mode. In some implementations, the primary DDR memory manager (DDR AUX P) sends a vote indication for deep sleep entry to the primary deep sleep entity (DS ARC P). The vote indication may be one-part of the evaluation by the primary deep sleep entity (DS ARC P) to enter the deep sleep state and begin deep sleep entry or deep sleep transition operations, as described further with reference to 535.

At 520, the primary deep sleep entity (DS ARC P) receives indications from a plurality of first clients of the primary chiplet or die for deep sleep entity. For example, each client of the plurality of first clients may vote for deep sleep entry or indicate that they are idle or otherwise able to be put to deep sleep. To illustrate, each client may send a message or vote to the primary deep sleep entity (DS ARC P) which aggregates the votes, such as by deep sleep entity (DS) thereof. In other implementations, each client may provide an indication to separate entity which aggregates the votes and sends a trigger to the primary deep sleep entity (DS ARC P).

At 525, the secondary deep sleep entity (DS ARC S) receives indications from a plurality of second clients of the secondary chiplet or die for deep sleep entity. For example, each client of the plurality of second clients may vote for deep sleep entry or indicate that they are idle or otherwise able to be put to deep sleep. To illustrate, each client may send a message or vote to the secondary deep sleep entity (DS ARC S) which aggregates the votes, such as by deep sleep entity (DS) thereof. In other implementations, each client may provide an indication to separate entity which aggregates the votes and sends a trigger to the secondary deep sleep entity (DS ARC S).

At 530, the secondary deep sleep entity (DS ARC S) sends an indication to the primary deep sleep entity (DS ARC P) for deep sleep entry. For example, the secondary deep sleep entity (DS ARC S) sends an indication to the primary deep sleep entity (DS ARC P) for deep sleep entry. To illustrate, the secondary deep sleep entity (DS ARC S) sends the aggregated votes to the primary deep sleep entity (DS ARC P) for deep sleep entry, such as for determining whether to perform deep sleep entry/transition operations.

At 535, the primary deep sleep entity (DS ARC P) determines to enable deep sleep. For example, the primary deep sleep entity (DS ARC P) performs one or more determinations to determine whether or not to enter the deep sleep mode or state, such as to perform deep sleep entry/transition operations. To illustrate, the primary deep sleep entity (DS ARC P) determines to enter the deep sleep mode based on a state of the DDR memory and based on a state of the clients of the primary and secondary chiplets of the first and second dies. As an illustrative example, the primary deep sleep entity (DS ARC P) determines to enter the deep sleep mode based on the indication from the primary DDR memory manager (DDR AUX P) indicating that the DDR memories are in the self-refresh state and based on the vote indications from the first and second clients indicating votes for the deep sleep state. In some implementations, each client of the primary and secondary chiplets has to vote for deep sleep. In other implementations, a majority or other threshold may be used, such as 60, 75, 80, 90, or 95 percent of all clients voting for deep sleep, as illustrative, non-limiting examples.

At 540, the primary deep sleep entity (DS ARC P) sends a deep sleep enable trigger to the secondary deep sleep entity (DS ARC S) to coordinate deep sleep entry/transition for the SoC. For example, the primary deep sleep entity (DS ARC P) sends a deep sleep enable trigger message or indication to the secondary deep sleep entity (DS ARC S) across the D2D communication interface indicating that the primary deep sleep entity (DS ARC P) has determined that the conditions for entering deep sleep have been satisfied and that the primary deep sleep entity (DS ARC P) has determined to enter the deep sleep mode. The deep sleep enable trigger message or indication may include or correspond to a deep sleep enable logic trigger indication which coordinates triggering of the deep sleep enable logic on other chiplets or dies.

At 545, the primary deep sleep entity (DS ARC P) sends a deep sleep enable trigger to the primary deep sleep enable logic (DS Enable Logic P) to enable deep sleep entry/transition for the primary chiplet/die. For example, the primary deep sleep entity (DS ARC P) sends a deep sleep enable trigger to the primary deep sleep enable logic (DS Enable Logic P) to enable deep sleep entry/transition for the primary chiplet/die based on and/or responsive to determining to enter the deep sleep mode at 535 or to the sending of the deep sleep enable trigger to the secondary deep sleep entity (DS ARC S) at 540.

In some implementations, the secondary deep sleep entity (DS ARC S) sends a response message or acknowledgement indication to the primary deep sleep entity (DS ARC P) based on and responsive to receiving the deep sleep enable trigger from the primary deep sleep entity (DS ARC P) at 540. In some such implementations, the primary deep sleep entity (DS ARC P) sends the deep sleep enable trigger to the primary deep sleep enable logic (DS Enable Logic P) responsive to receiving the message or acknowledgement indication from the secondary deep sleep entity (DS ARC S).

At 550, the secondary deep sleep entity (DS ARC S) sends a deep sleep enable trigger to the secondary deep sleep enable logic (DS Enable Logic S) to enable deep sleep entry/transition for the secondary chiplet/die. For example, the secondary deep sleep entity (DS ARC S) sends a deep sleep enable trigger to the secondary deep sleep enable logic (DS Enable Logic S) to enable deep sleep entry/transition for the secondary chiplet/die based on and/or responsive to receiving the deep sleep enable trigger from the primary deep sleep entity (DS ARC P) at 540.

At 555, the primary deep sleep entity (DS ARC P) sends a deep sleep indication to the primary sleep hardening logic (AWSM P) to trigger a deep sleep event for SoC. For example, the primary deep sleep entity (DS ARC P) sends a deep sleep branch event trigger message to the primary sleep hardening logic (AWSM P) to trigger deep sleep hardening operations across the chiplets of the SoC based on and/or responsive to determining to enter the deep sleep mode at 535, the sending of the deep sleep enable trigger to the secondary deep sleep entity (DS ARC S) at 540, or the sending of the deep sleep enable trigger to the primary deep sleep enable logic (DS Enable Logic P) at 545.

At 560, the primary sleep hardening logic (AWSM P) performs sleep hardening operations for the primary chiplet/die. For example, the primary sleep hardening logic (AWSM P) prepares subsystems of the primary chiplet/die for deep sleep transition. To illustrate, the primary sleep hardening logic (AWSM P) executes a deep sleep sequence. The deep sleep sequence may transition subsystems of the primary chiplet/die to a state that is prepared (e.g., "hardened") for deep sleep, such as ready for collapse of power rails/ disconnection from power.

At 565, the primary sleep hardening logic (AWSM P) coordinates sleep hardening operations for other chiplets/dies of the SoC. For example, the primary sleep hardening logic (AWSM P) and the secondary sleep hardening logic (AWSM S) perform chiplet subsystem sleep hardening coordination operations. For example, the primary sleep hardening logic (AWSM P) and the secondary sleep hardening logic (AWSM S) exchange messages across the D2D interface to coordinate transitioning their corresponding subsystems to a sleep hardened state. In other implementations, the primary sleep hardening logic (AWSM P) coordinates the sleep hardening operations for other chiplets/dies of the SoC prior to performing the sleep hardening operations for the primary chiplet/die at 560, or after the the secondary sleep hardening logic (AWSM S) performs sleep hardening operations for the secondary chiplet/die at 570.

At 570, the secondary sleep hardening logic (AWSM S) performs sleep hardening operations for the secondary chiplet/die. For example, the secondary sleep hardening logic (AWSM S) prepares subsystems of the secondary chiplet/die for deep sleep transition based on and responsive to the sleep hardening coordination operations at 570. To illustrate, the secondary sleep hardening logic (AWSM S) executes a deep sleep sequence responsive to receiving a sleep hardening trigger from the primary sleep hardening logic (AWSM P). The deep sleep sequence may transition subsystems of the secondary chiplet/die to a state that is prepared (e.g., "hardened") for deep sleep.

At 575, the primary sleep hardening logic (AWSM P) sends a trigger indication to the PMIC. For example, the primary sleep hardening logic (AWSM P) sends a trigger message to the PMIC to trigger a DS PBS of the PMIC based on and/or responsive to performing the sleep hardening operations for the primary chiplet/die at 560. In some implementations, the trigger message to the PMIC is sent by the primary sleep hardening logic (AWSM P) after coordination with and/or confirmation from the other chiplets or completion of sleep hardening operations. The DS PBS of the PMIC(s) may include a series of operations which collapses power rails or transitions the power rails to a low power or retention state.

Although one PMIC, the SoC may have multiple PMICs. The PMICs may have a primary and secondary configuration or a distributed configuration. In distributed configurations, an AWSM block of each chiplet or die may trigger a corresponding PMIC. In primary/secondary configurations, the primary PMIC may be triggered by a primary AWSM block, and then the primary PMIC may coordinate with other secondary PMICs to control DS PBS operations on other chiplets/dies (e.g., DS PBS operations of the other secondary or non-primary PMICs). In a multi PMIC solution, the primary sleep hardening logic (AWSM P) might coordinate with only one PMIC or all PMICs regardless if they are used for primary or secondary exclusively. For example, the PMICs might be daisy chained and the primary PMIC may only trigger one other PMIC, which then triggers another PMIC and so on.

Although acknowledgements are not shown, each message or indication may have an associated acknowledgement (ACK). Additionally, or alternatively, although most message or indications are described as push or triggering indications, in some implementations, such messages or indication may be pulled or prompted by a request or trigger message.

Figure 6:
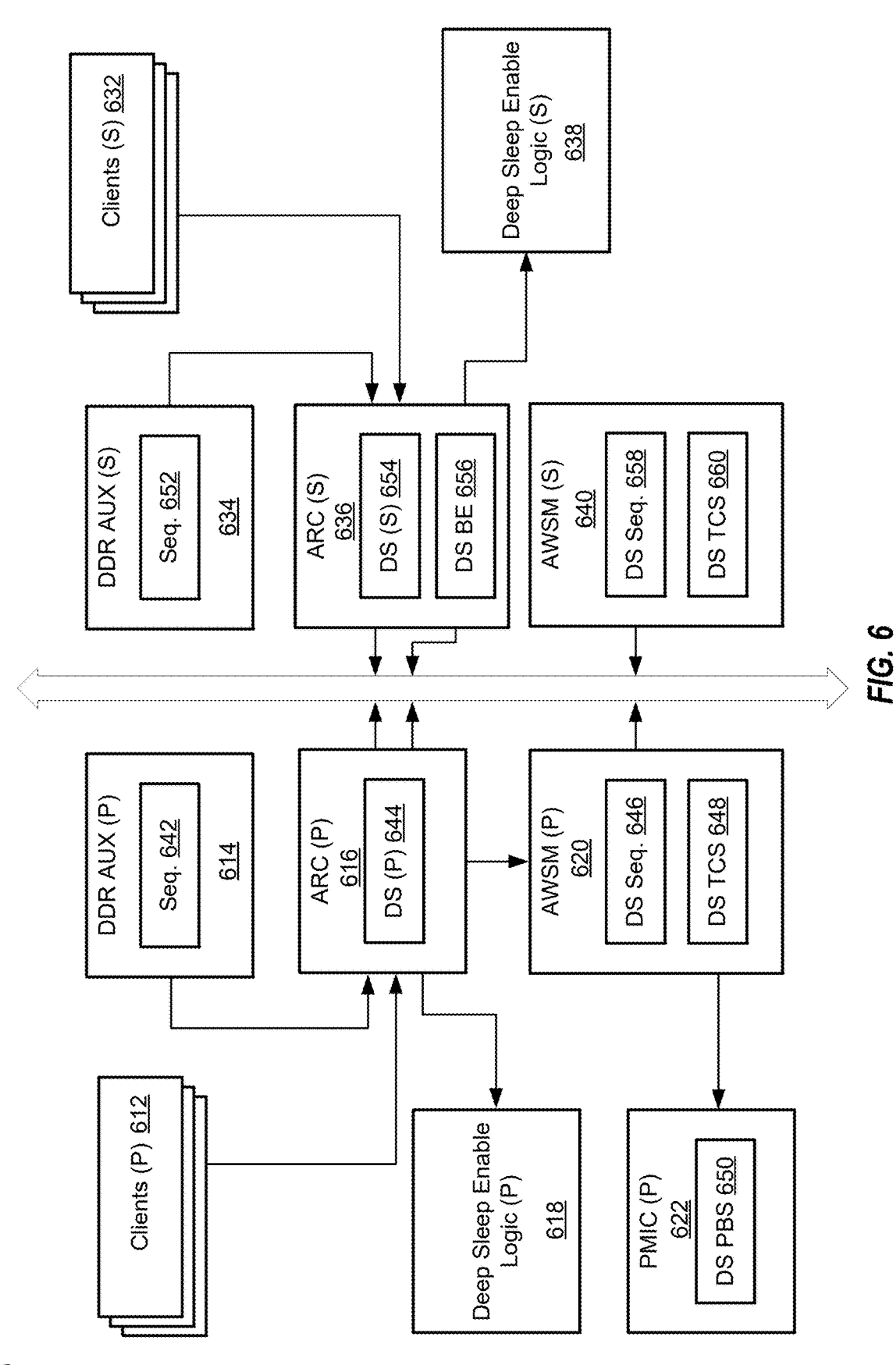
FIG. 6 is a block diagram illustrating an example of an enhanced deep sleep architecture for multiple chip SoCs according to some aspects of the disclosure.

Referring to FIG. 6, FIG. 6 is an example of an SoC architecture with homogenous chiplets and an independent DDR configuration. In FIG. 6, an SoC 600 that is configured for enhanced deep sleep operations is illustrated.

In the ICHI configuration of FIG. 4, the DDR memories across chiplet/dies are presented as a single resource so there is no local resource for the secondary die, and there is only a backend resource because it is not independently controlled. In the independent DDR configuration of FIG. 6, the DDR memory is presented as two resources, and so there is a local resource per die to control each independently. Additionally, there would be a remote resource on the primary die for the secondary's DDR memory and a remote resource on the secondary die for the primary's DDR memory.

The SoC 600 includes multiple chiplet or dies. In the example of FIG. 6, two chiplets and dies are illustrated for simplicity, that is a first chiplet on a first die and a second chiplet on a second die connected to each other via die-to-die (D2D) interface and where the chiplets are the same type, as described with reference to FIG. 3B. In other examples, the SoC 600 may include more chiplets of the same type. In the particular example illustrated in FIG. 6, the SoC 600 includes a primary chiplet on a primary die and a secondary chiplet on a secondary die with the exact same subsystems and components.

The SoC 600 includes similar subsystems and components described with reference to the SoC of FIG. 2 and/or the SoC 400 of FIG. 4. For example, the primary chiplet of the SoC 600 includes a first plurality of clients 612 (clients P), a first DDR AUX 614 (DDR AUX P), a first ARC 616 (ARC P), first deep sleep enable logic 618 (DS enable logic P), first AOSS logic 620 (AWSM P), and a PMIC 622 (PMIC P). The secondary chiplet of the SoC 600 includes a second plurality of clients 632 (clients S), a second DDR AUX 634 (DDR AUX S), a second ARC 636 (ARC S), second deep sleep enable logic 638 (DS enable logic S), and second AOSS logic 640 (AWSM S).

The first plurality of clients 612 (e.g., first clients) may include or correspond to the plurality of clients 212 of FIG. 2 and/or the first plurality of clients 412 of FIG. 4. The first DDR AUX 614 (DDR AUX P) may include or correspond to the DDR AUX 214 of FIG. 2 and/or the first DDR AUX 414 of FIG. 4. The first DDR AUX 614 may include a sequencer 642, and the sequencer 642 may include or correspond to the sequencer 232 of FIG. 2 and/or the sequencer 442 of FIG. 4.

The first ARC 616 (ARC P) may include or correspond to the ARC 216 of FIG. 2 and/or the first ARC 416 (ARC P) of FIG. 4. The first ARC 616 (ARC P) may include a first deep sleep entity 644 (DS P), and the first deep sleep entity 644 (DS P) may include or correspond to the deep sleep entity 242 of FIG. 2 and/or the deep sleep entity 444 (DS P) of FIG. 4. The first deep sleep enable logic 618 (DS enable logic P) may include or correspond to the deep sleep enable logic 218 of FIG. 2 and/or the first deep sleep enable logic 418 of FIG. 4.

The first AOSS logic 620 (AWSM P) may include or correspond to the AOSS sleep hardening logic 220 of FIG. 2 and/or the first AOSS logic 420 (AWSM P) of FIG. 4. The first AOSS logic 620 (AWSM P) may include a first deep sleep sequencer 646 (DS Seq.) and a first DS TCS 648. The first deep sleep sequencer 646 may include or correspond to the DS Seq. 252 of FIG. 2 and/or the first deep sleep sequencer 446 of FIG. 4, and the first DS TCS 648 may include or correspond to the DS TCS 255 of FIG. 2 and/or the first DS TCS 448 of FIG. 4.

The PMIC 622 (PMIC P) may include or correspond to the PMIC 222 of FIG. 2 and/or the PMIC 422 (PMIC P) of FIG. 4. The PMIC 622 (PMIC P) may include a deep sleep programable boot sequence (DS PBS) 650, and the DS PBS 650 may include or correspond to the DS PBS 262 of FIG. 2 and/or the DS PBS 450 of FIG. 4.

Although the first DDR AUX 614, the first ARC 616 (ARC P), and the first AOSS logic 620 (AWSM P) are illustrated as separate components, in some implementations, two or more of the first DDR AUX 614, the first ARC 616 (ARC P), and the first AOSS logic 620 (AWSM P) are unitary or part of the same component. Each of the first DDR AUX 614, the first ARC 616 (ARC P), and the first AOSS logic 620 (AWSM P) may be referred to generally as deep sleep logic or components.

The second plurality of clients 632 (e.g., second clients) may include or correspond to the plurality of clients 212 of FIG. 2 and/or the first plurality of clients 612. The second DDR AUX 634 (DDR AUX S) may include or correspond to DDR AUX 214 of FIG. 2 and/or the first DDR AUX 614 (DDR AUX P), as described above. The second DDR AUX 634 (DDR AUX S) may include a second sequencer 652. The second sequencer 652 may include or correspond to the sequencer 232 of FIG. 2 or the sequencer 642.

In the example of FIG. 6, the second DDR AUX 634, such as the second sequencer 652 thereof, is configured to vote or otherwise indicate to the SoC 600, such as to the second ARC 636, that the second DDR memory is in or is able to enter a low power or sleep state, such as a refresh state or mode. As compared to the example of FIG. 4, where the second DDR AUX 434 communicates across the D2D interface with the first DDR AUX 414 to provide the indication that the second DDR memory is in the self-refresh mode and/or the vote for deep sleep, the second DDR AUX 634 provides the indication or information to the second ARC 636 (ARC S) for aggregation and communication with the primary chiplet (e.g., via the first ARC 616 (ARC P)).

The second ARC 636 (ARC S) may include or correspond to the ARC 216 of FIG. 2 and/or the first ARC 616 (ARC P), as described above. The second ARC 636 (ARC S) may include a second deep sleep entity 654 (DS S) and a deep sleep backend entity 656 (DS BE). The second deep sleep entity 654 (DS S) may include or correspond to the deep sleep entity 242 of FIG. 2 and/or the first deep sleep entity

644 (DS P), as described above. The deep sleep backend entity 656 (DS BE) may include or correspond to the deep sleep backend entity 456 (DS BE) of FIG. 4. In the example of FIG. 6, the second ARC 636 (ARC S) is further configured to provide or relay the indication from the second DDR AUX 634 (DDR AUX S) that the second DDR memory is in the self-refresh state to the first ARC 616 (ARC P).

The second deep sleep enable logic 638 (DS enable logic S) may include or correspond to the deep sleep enable logic 218 of FIG. 2 and/or the first deep sleep enable logic 618 (DS enable logic P), as described above.

The second AOSS logic 640 (AWSM S) may include or correspond to the AOSS sleep hardening logic 220 of FIG. 2 and/or the first AOSS logic 620 (AWSM P), as described above.

The second AOSS logic 640 (AWSM S) may include a second deep sleep sequencer 658 (DS Seq.) and a second DS TCS 660. The second deep sleep sequencer 658 may include or correspond to the DS Seq. 252 of FIG. 2 and/or the first deep sleep sequencer 646, as described above. The second DS TCS 660 may include or correspond to the DS TCS 255 of FIG. 2 and/or the first DS TCS 648, as described above.

In the example of FIG. 6, the components of the first DDR AUX 614, the first ARC 616, the first AOSS logic 620, and the second AOSS logic 640 may include or correspond to local resources. For example, the first deep sleep entity 644 may include or correspond to a local resource of the primary chiplet/die. As another example, the second sequencer 652 of the second DDR AUX 634 may include or correspond to a local resource of the secondary chiplet/die.

Additionally, the components of the second ARC 636 may include or correspond to remote or backend resources. For example, the second deep sleep entity 654 of the second ARC 636 may include or correspond to a remote resource of the primary chiplet/die and located on the secondary chiplet/die. As another example, the deep sleep backend entity 656 of the second ARC 636 may include or correspond to a backend resource.

As compared to the SoC 400 of FIG. 4, the SoC 600 of FIG. 6 does not utilize the D2D interface to transmit DDR memory state information between DDR AUXs. Rather, for the SoC 600 of FIG. 6, the second DDR Aux on the secondary chiplet or die communicates with the second DS ARC on the secondary chiplet or die to indicate a mode or state of the DDR memory on the secondary chiplet or die and/or vote for deep sleep. The operations of the SoC 600 of FIG. 6 are described with reference to FIG. 7.

Figure 7:
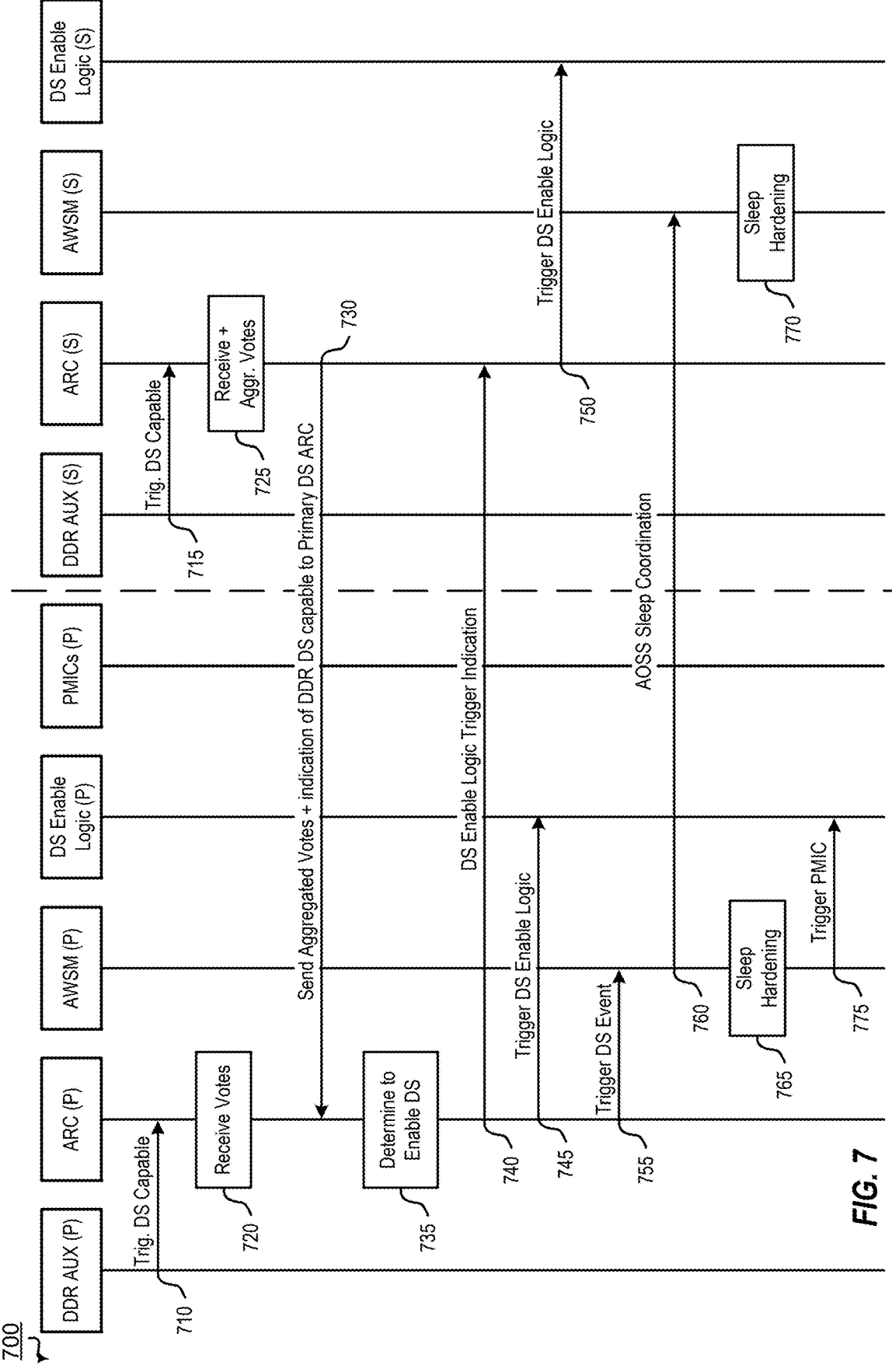
FIG. 7 is a flow diagram illustrating an example of enhanced deep sleep operations for multiple chip SoCs according to some aspects of the disclosure.

Referring to FIG. 7, FIG. 7 is an example of enhanced deep sleep operations for an SoC architecture with homogenous chiplets and an independent DDR configuration, such as the SoC 600 of FIG. 6. In FIG. 7, a flow diagram of enhanced deep sleep operations is illustrated.

As compared to the example of FIGS. 4 and 5, in the example of FIGS. 6 and 7, the primary DDR memory manager (DDR AUX P) and the secondary DDR memory manager (DDR AUX S) do not perform DDR sleep coordination operations. For example, the primary DDR memory manager (DDR AUX P) and the secondary DDR memory manager (DDR AUX S) do not exchange messages across the D2D interface to coordinate transitioning their corresponding DDR memories to a low-power or self-refresh mode. Rather, each DDR memory manager communicates with a corresponding deep sleep entity of their respective chiplet to relay, vote, or indicate a status of their respective DDR memory to the corresponding deep sleep entity.

During operation of the SoC, at 710, the primary DDR memory manager (DDR AUX P) sends a trigger to the primary deep sleep entity (DS ARC P). For example, the primary DDR memory manager (DDR AUX P) sends a trigger message or indication to the primary deep sleep entity (DS ARC P) indicating that the corresponding DDR memories of the SoC (e.g., at least the primary and secondary DDR memories) are in the low-power or self-refresh mode. In some implementations, the primary DDR memory manager (DDR AUX P) sends a vote indication for deep sleep entry to the primary deep sleep entity (DS ARC P). The vote indication may be one-part of the evaluation by the primary deep sleep entity (DS ARC P) to enter the deep sleep state and begin deep sleep entry or deep sleep transition operations, as described further with reference to 735.

At 715, the secondary DDR memory manager (DDR AUX S) sends a trigger to the secondary deep sleep entity (DS ARC S). For example, the secondary DDR memory manager (DDR AUX S) sends a trigger message or indication to the secondary deep sleep entity (DS ARC S) indicating that the corresponding DDR memories of the SoC (e.g., at least the secondary and secondary DDR memories) are in the low-power or self-refresh mode. In some implementations, the secondary DDR memory manager (DDR AUX S) sends a vote indication for deep sleep entry to the secondary DDR memory manager (DDR AUX S). The vote indication may be one-part of the evaluation by the secondary deep sleep entity (DS ARC S) to enter the deep sleep state and begin deep sleep entry or deep sleep transition operations, as described further below.

At 720, the primary deep sleep entity (DS ARC P) receives indications from a plurality of first clients of the primary chiplet or die for deep sleep entity. For example, each client of the plurality of first clients may vote for deep sleep entry or indicate that they are idle or otherwise able to be put to deep sleep. To illustrate, each client may send a message or vote to the primary deep sleep entity (DS ARC P) which aggregates the votes, such as by deep sleep entity (DS) thereof. In other implementations, each client may provide an indication to separate entity which aggregates the votes and sends a trigger to the primary deep sleep entity (DS ARC P).

At 725, the secondary deep sleep entity (DS ARC S) receives indications from a plurality of second clients of the secondary chiplet or die for deep sleep entity. For example, each client of the plurality of second clients may vote for deep sleep entry or indicate that they are idle or otherwise able to be put to deep sleep. To illustrate, each client may send a message or vote to the secondary deep sleep entity (DS ARC S) which aggregates the votes, such as by deep sleep entity (DS) thereof. In other implementations, each client may provide an indication to separate entity which aggregates the votes and sends a trigger to the secondary deep sleep entity (DS ARC S).

At 730, the secondary deep sleep entity (DS ARC S) sends an indication to the primary deep sleep entity (DS ARC P) for deep sleep entry. For example, the secondary deep sleep entity (DS ARC S) sends an indication to the primary deep sleep entity (DS ARC P) across the D2D interface voting for deep sleep entry or indicating the second chiplet/die is read for deep sleep entry. To illustrate, the secondary deep sleep entity (DS ARC S) sends the aggregated votes to the primary deep sleep entity (DS ARC P) for deep sleep entry and the indication that the second DDR memory is in the self-refresh state, such as for determining whether to perform deep sleep entry/transition operations. In some implementations, the secondary deep sleep entity (DS ARC S) determines to send the indications together responsive to receiving both indications. In other implementations, the secondary deep sleep entity (DS ARC S) sends each indication, such as the DDR indication and the client indication or client votes) separately and responsive to receiving the indications or votes.

At 735, the primary deep sleep entity (DS ARC P) determines to enable deep sleep. For example, the primary deep sleep entity (DS ARC P) performs one or more determinations to determine whether or not to enter the deep sleep mode or state, such as to perform deep sleep entry/transition operations. To illustrate, the primary deep sleep entity (DS ARC P) determines to enter the deep sleep mode based on a state of the DDR memory and based on a state of the clients of the first and second dies/of the primary and secondary chiplets. As an illustrative example, the primary deep sleep entity (DS ARC P) determines to enter the deep sleep mode based on the indication from the primary DDR memory manager (DDR AUX P) indicating that the DDR memories are in the self-refresh state and based on the vote indications from the first and second clients indicating votes for the deep sleep state. In some implementations, each client of the primary and secondary chiplets has to vote for deep sleep. In other implementations, a majority or other threshold may be used, such as 60, 75, 80, 90, or 95 percent of all clients voting for deep sleep, as illustrative, non-limiting examples.

At 740, the primary deep sleep entity (DS ARC P) sends a deep sleep enable trigger to the secondary deep sleep entity (DS ARC S) to coordinate deep sleep entry/transition for the SoC. For example, the primary deep sleep entity (DS ARC P) sends a deep sleep enable trigger message or indication to the secondary deep sleep entity (DS ARC S) across the D2D communication interface indicating that the primary deep sleep entity (DS ARC P) has determined that the conditions for entering deep sleep have been satisfied and that the primary deep sleep entity (DS ARC P) has determined to enter the deep sleep mode. The deep sleep enable trigger message or indication may include or correspond to a deep sleep enable logic trigger indication which coordinates triggering of the deep sleep enable logic on other chiplets or dies.

At 745, the primary deep sleep entity (DS ARC P) sends a deep sleep enable trigger to the primary deep sleep enable logic (DS Enable Logic P) to enable deep sleep entry/transition for the primary chiplet/die. For example, the primary deep sleep entity (DS ARC P) sends a deep sleep enable trigger to the primary deep sleep enable logic (DS Enable Logic P) to enable deep sleep entry/transition for the primary chiplet/die based on and/or responsive to determining to enter the deep sleep mode at 735 or to the sending of the deep sleep enable trigger to the secondary deep sleep entity (DS ARC S) at 740.

In some implementations, the secondary deep sleep entity (DS ARC S) sends a response message or acknowledgement indication to the primary deep sleep entity (DS ARC P) based on and responsive to receiving the deep sleep enable trigger from the primary deep sleep entity (DS ARC P) at 740. In some such implementations, the primary deep sleep entity (DS ARC P) sends the deep sleep enable trigger to the primary deep sleep enable logic (DS Enable Logic P) responsive to receiving the message or acknowledgement indication from the secondary deep sleep entity (DS ARC S).

At 750, the secondary deep sleep entity (DS ARC S) sends a deep sleep enable trigger to the secondary deep sleep enable logic (DS Enable Logic S) to enable deep sleep entry/transition for the secondary chiplet/die. For example, the secondary deep sleep entity (DS ARC S) sends a deep sleep enable trigger to the secondary deep sleep enable logic (DS Enable Logic S) to enable deep sleep entry/transition for the secondary chiplet/die based on and/or responsive to receiving the deep sleep enable trigger from the primary deep sleep entity (DS ARC P) at 740.

At 755, the primary deep sleep entity (DS ARC P) sends a deep sleep indication to the primary sleep hardening logic (AWSM P) to trigger a deep sleep event for SoC. For example, the primary deep sleep entity (DS ARC P) sends a deep sleep branch event trigger message to the primary sleep hardening logic (AWSM P) to trigger a deep sleep hardening operations across the chiplets of the SoC based on and/or responsive to determining to enter the deep sleep mode at 735, the sending of the deep sleep enable trigger to the secondary deep sleep entity (DS ARC S) at 740, or the sending of the deep sleep enable trigger to the primary deep sleep enable logic (DS Enable Logic P) at 745.

At 760, the primary sleep hardening logic (AWSM P) coordinates sleep hardening operations for other chiplets/dies of the SoC. For example, the primary sleep hardening logic (AWSM P) and the secondary sleep hardening logic (AWSM S) perform chiplet subsystem sleep hardening coordination operations. For example, the primary sleep hardening logic (AWSM P) and the secondary sleep hardening logic (AWSM S) exchange messages across the D2D interface to coordinate transitioning their corresponding subsystems to a sleep hardened state.

At 765, the primary sleep hardening logic (AWSM P) performs sleep hardening operations for the primary chiplet/die. For example, the primary sleep hardening logic (AWSM P) prepares subsystems of the primary chiplet/die for deep sleep transition. To illustrate, the primary sleep hardening logic (AWSM P) executes a deep sleep sequence responsive to coordination of sleep hardening operations at 760. The deep sleep sequence may transition subsystems of the primary chiplet/die to a state that is prepared (e.g., "hardened") for deep sleep, such as ready for collapse of power rails/disconnection from power.

At 770, the secondary sleep hardening logic (AWSM S) performs sleep hardening operations for the secondary chiplet/die. For example, the secondary sleep hardening logic (AWSM S) prepares subsystems of the secondary chiplet/die for deep sleep transition based on and responsive to the sleep hardening coordination operations at 770. To illustrate, the secondary sleep hardening logic (AWSM S) executes a deep sleep sequence responsive to receiving a sleep hardening trigger from the primary sleep hardening logic (AWSM P). The deep sleep sequence may transition subsystems of the secondary chiplet/die to a state that is prepared (e.g., "hardened") for deep sleep.

At 775, the primary sleep hardening logic (AWSM P) sends a trigger indication to the PMIC. For example, the primary sleep hardening logic (AWSM P) sends a trigger message to the PMIC to trigger a DS PBS of the PMIC based on and/or responsive to performing the sleep hardening operations for the primary chiplet/die at 760. In some implementations, the trigger message to the PMIC is sent by the primary sleep hardening logic (AWSM P) after coordination with and/or confirmation from the other chiplets of completion of sleep hardening operations. For example, the trigger message may be sent responsive to receipt of confirmation of performance of sleep hardening operations at 765 and 770. The DS PBS of the PMIC(s) may include a series of operations which collapses power rails or transitions the power rails to a low power or retention state.

Figure 8:
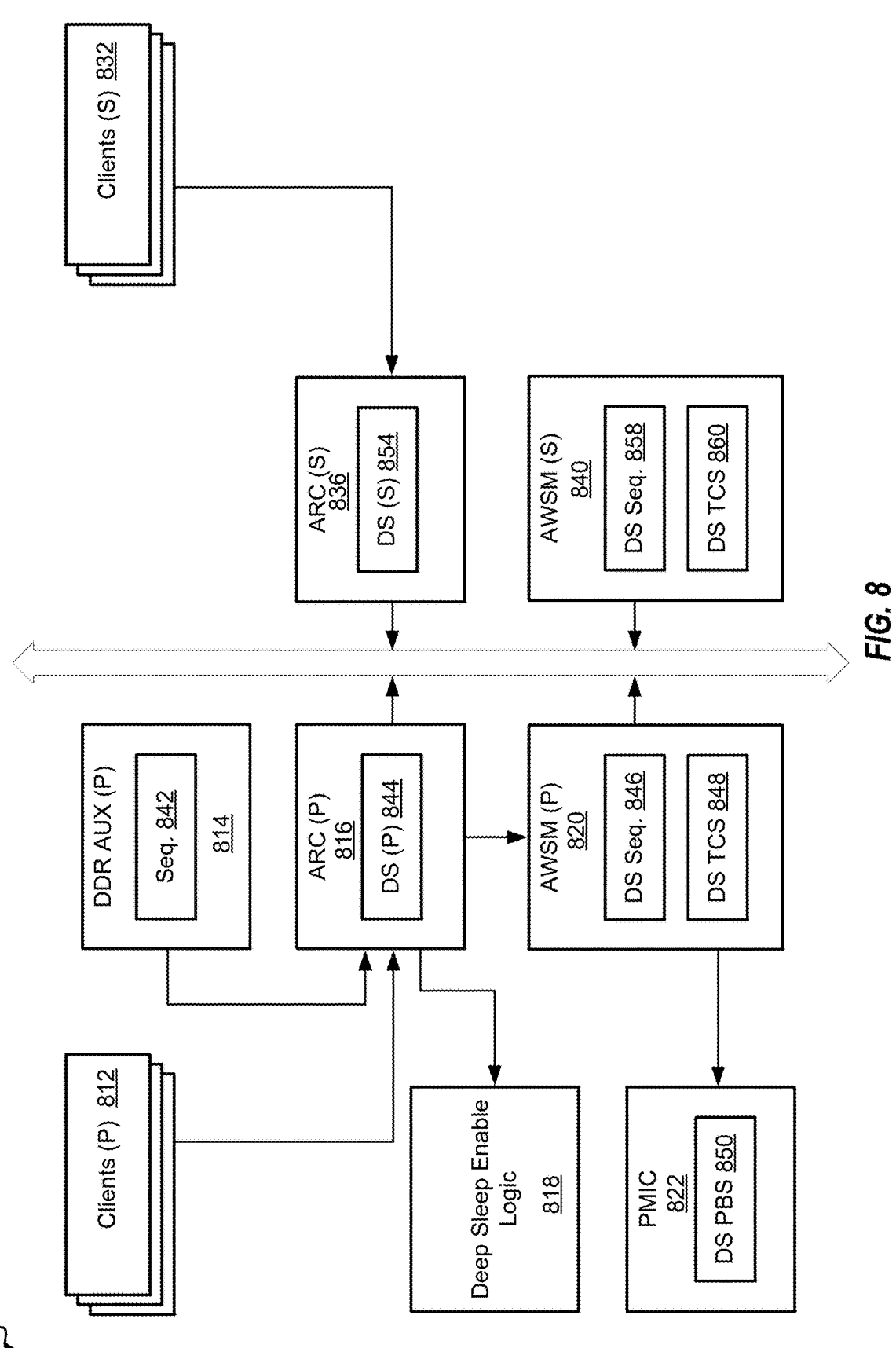
FIG. 8 is a block diagram illustrating an example of an enhanced deep sleep architecture for multiple chip SoCs according to some aspects of the disclosure.

Referring to FIG. 8, FIG. 8 is an example of an SoC architecture with heterogenous chiplets and a primary-only DDR configuration. In FIG. 8, an SoC 800 that is configured for enhanced deep sleep operations is illustrated.

The SoC 800 includes multiple chiplet or dies. In the example of FIG. 8, two chiplets and dies are illustrated for simplicity, that is a first chiplet on a first die and a second chiplet on a second die connected to each other via die-to-die (D2D) interface and where the chiplets are not the same type, as described with reference to FIG. 3C. In other examples, the SoC 800 may include more chiplets of the primary/first type, the secondary/second type, or of a different type. In the particular example illustrated in FIG. 8, the SoC 800 includes a primary chiplet on a primary die and a secondary chiplet on a secondary die with at least one different subsystem or component.

The SoC 800 includes similar subsystems and components described with reference to the SoC of FIG. 2, the SoC 400 of FIG. 4, and/or the SoC 600 of FIG. 6. For example, the primary chiplet of the SoC 800 includes a first plurality of clients 812 (clients P), a DDR AUX 814 (DDR AUX P), a first ARC 816 (ARC P), deep sleep enable logic 818 (DS enable logic P), first AOSS logic 820 (AWSM P), and a PMIC 822 (PMIC P). The secondary chiplet of the SoC 800 includes a second plurality of clients 832 (clients S), a second ARC 836 (ARC S), and second AOSS logic 840 (AWSM S). In the example of FIG. 8, the second chiplet has a second type that is different from a first type of the primary chiplet.

The first plurality of clients 812 (e.g., first clients) may include or correspond to the plurality of clients 212 of FIG. 2 and/or any of the first plurality of clients 412, 612, or 812 of FIG. 4, 6, or 8. The DDR AUX 814 (DDR AUX P) may include or correspond to the DDR AUX 214 of FIG. 2, the first DDR AUX 414 of FIG. 4, and/or the first DDR AUX 614 of FIG. 6. The DDR AUX 814 may include a sequencer 842, and the sequencer 842 may include or correspond to the sequencer 232 of FIG. 2, the sequencer 442 of FIG. 4, and/or the sequencer 642 of FIG. 6.

The first ARC 816 (ARC P) may include or correspond to the ARC 216 of FIG. 2, the first ARC 416 (ARC P) of FIG. 4, and/or the first ARC 616 (ARC P) of FIG. 6. The first ARC 816 (ARC P) may include a first deep sleep entity 844 (DS P), and the first deep sleep entity 844 (DS P) may include or correspond to the deep sleep entity 242 of FIG. 2, the deep sleep entity 444 of FIG. 4, and/or the deep sleep entity 644 of FIG. 6. The deep sleep enable logic 818 (DS enable logic P) may include or correspond to the deep sleep enable logic 218 of FIG. 2, the first deep sleep enable logic 418 of FIG. 4, and/or the deep sleep enable logic 618 of FIG. 6.

The first AOSS logic 820 (AWSM P) may include or correspond to the AOSS sleep hardening logic 220 of FIG. 2, the first AOSS logic 420 of FIG. 4, and/or the first AOSS logic 620 of FIG. 6. The first AOSS logic 820 (AWSM P) may include a first deep sleep sequencer 846 (DS Seq.) and a first DS TCS 848. The first deep sleep sequencer 846 may include or correspond to the DS Seq. 252 of FIG. 2, the first deep sleep sequencer 446 of FIG. 4, and/or the first deep sleep sequencer 646 of FIG. 6, and the first DS TCS 848 may include or correspond to the DS TCS 255 of FIG. 2, the first DS TCS 448 of FIG. 4, and/or the first DS TCS 648 of FIG. 6.

The PMIC 822 (PMIC P) may include or correspond to the PMIC 222 of FIG. 2, the PMIC 422 of FIG. 4, and/or the PMIC 622 of FIG. 6. The PMIC 822 (PMIC P) may include a deep sleep programable boot sequence (DS PBS) 850, and the DS PBS 850 may include or correspond to the DS PBS 262 of FIG. 2, the DS PBS 450 of FIG. 4, and/or the DS PBS 650 of FIG. 6.

Although the DDR AUX 814, the first ARC 816 (ARC P), and the first AOSS logic 820 (AWSM P) are illustrated as separate components, in some implementations, two or more of the DDR AUX 814, the first ARC 816 (ARC P), and the first AOSS logic 820 (AWSM P) are unitary or part of the same component. Each of the DDR AUX 814, the first ARC 816 (ARC P), and the first AOSS logic 820 (AWSM P) may be referred to generally as deep sleep logic or components.

The second plurality of clients 832 (e.g., second clients) may include or correspond to the plurality of clients 212 of FIG. 2 and/or the first plurality of clients 812. As compared to the examples of FIGS. 4 and 6, the SoC 800 of FIG. 8 does not include a second DDR AUX component on the secondary chiplet, as there is no second DDR memory on the secondary chiplet. In the example of FIG. 8, the DDR AUX 814 of the SoC 800 performs the self-refresh related operations for the primary DDR of the primary chiplet and optionally DDR memories on other chiplets.

The second ARC 836 (ARC S) may include or correspond to the ARC 216 of FIG. 2 and/or the first ARC 816 (ARC P), as described above. The second ARC 836 (ARC S) may include a second deep sleep entity 854 (DS S), and the second deep sleep entity 854 (DS S) may include or correspond to the deep sleep entity 242 of FIG. 2 and/or the first deep sleep entity 844 (DS P) as described above.

As compared to the examples of FIGS. 4 and 6, the SoC 800 of FIG. 8 does not include a second deep sleep enable logic component on the secondary chiplet. In the example of FIG. 8, the deep sleep enable logic 818 of the SoC 800 performs the deep sleep enable operations for each of the chiplets or the entire SoC 800.

The second AOSS logic 840 (AWSM S) may include or correspond to the AOSS sleep hardening logic 220 of FIG. 2 and/or the first AOSS logic 820 (AWSM P), as described above. The second AOSS logic 840 (AWSM S) may include a second deep sleep sequencer 858 (DS Seq.) and a second DS TCS 860. The second deep sleep sequencer 858 may include or correspond to the DS Seq. 252 of FIG. 2 and/or the first deep sleep sequencer 846 as described above. The second DS TCS 860 may include or correspond to the DS TCS 255 of FIG. 2 and/or the first DS TCS 848, as described above.

In the example of FIG. 8, the components of the first DDR AUX 814, the first ARC 816, the first AOSS logic 820, and the second AOSS logic 840 may include or correspond to local resources. For example, the first deep sleep entity 844 may include or correspond to a local resource of the primary chiplet/die, and the second deep sleep sequencer 858 may include or correspond to a local resource of the secondary chiplet/die. Additionally, the components of the second ARC 836 may include or correspond to remote resources. For example, the second deep sleep entity 854 of the second ARC 836 may include or correspond to a remote resource of the primary chiplet/die and located on the secondary chiplet/die.

As compared to the SoCs 400 and 600 of FIGS. 4 and 6, the SoC 800 of FIG. 8 does not include a second deep sleep enable logic on the secondary chiplet or die which is configured to control deep sleep enable operations on the secondary chiplet or die. Rather, the deep sleep enable logic on the primary chiplet or die may be configured to control deep sleep enable operations on multiple chiplets or dies of the SoC 800 or the whole SoC 800. Additionally, the SoC 800 of FIG. 8 does not include a second DDR memory on the secondary chiplet or die, and thus the SoC 800 does not have a second DDR AUX on the secondary chiplet or die. Consequently, the SoC 800 does not utilize the D2D interface to transmit DDR memory state information between DDR AUXs and does not utilize the D2D interface to trigger a DS BE of the second DS ARC on the secondary chiplet or die to trigger the second deep sleep enable logic. The operations of the SoC 800 of FIG. 8 are described with reference to FIG. 9.

Figure 9:
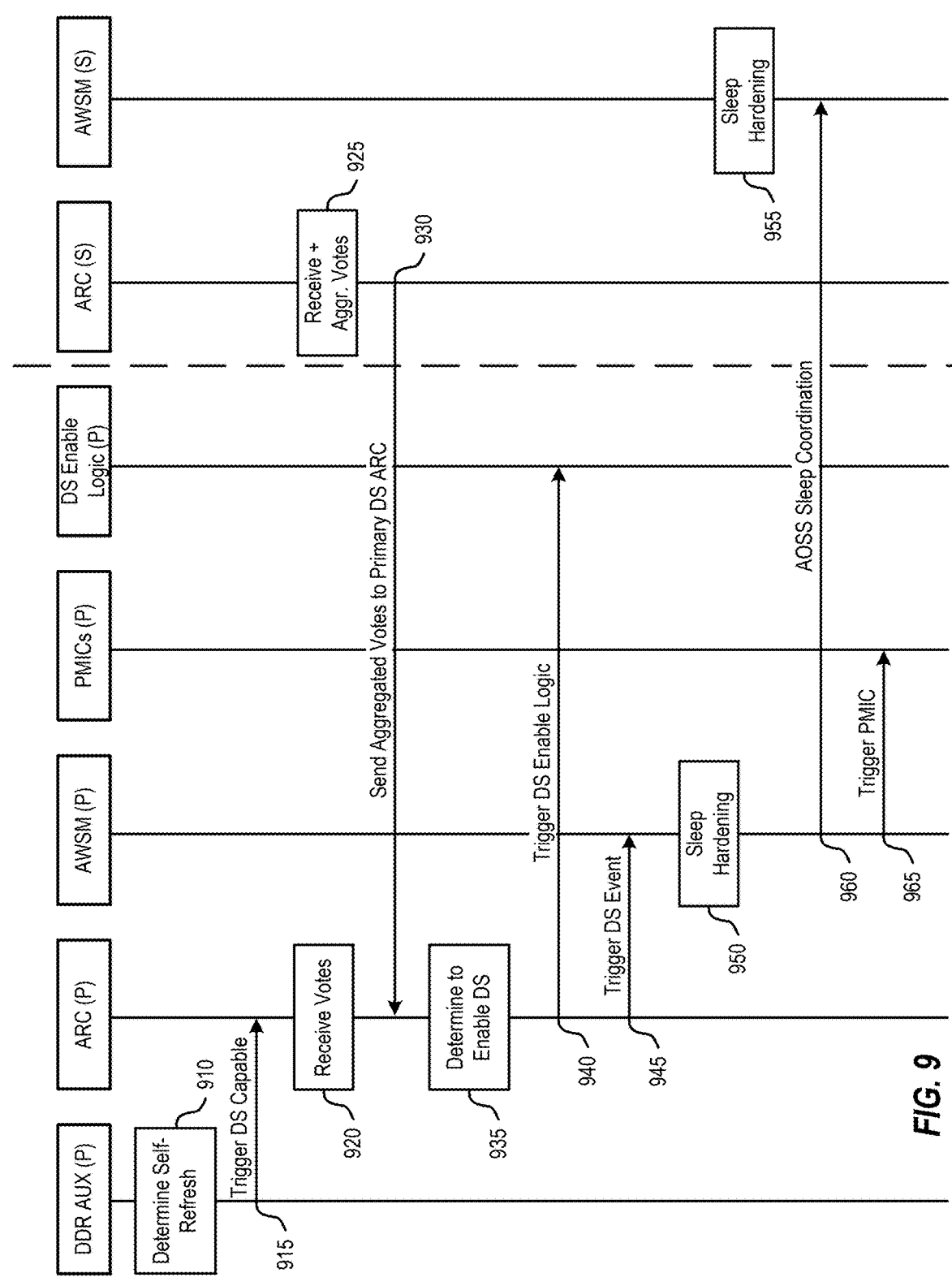
FIG. 9 is a flow diagram illustrating an example of enhanced deep sleep operations for multiple chip SoCs according to some aspects of the disclosure.

Referring to FIG. 9, FIG. 9 is an example of enhanced deep sleep operations for an SoC architecture with heterogenous chiplets and a primary-only DDR configuration, such as the SoC 800 of FIG. 8. In FIG. 9, a flow diagram of enhanced deep sleep operations is illustrated. As compared to the homogenous examples of FIGS. 4-7, the heterogenous examples of FIGS. 8-11 have dies or chiplets with different configurations.

During operation of the SoC 800 of FIG. 8, at 910, the primary DDR memory manager (DDR AUX P) determines that the primary DDR memory is in a self-refresh state, or is capable of transitioning to a self-refresh state. For example, the primary DDR memory manager (DDR AUX P) may determine that the primary DDR memory of the primary chiplet or die satisfies one or more conditions for transition to a low-power state or may receive an instruction from the primary deep sleep entity (ARC P) to transition the primary DDR memory to the low-power state. To illustrate, the primary DDR memory manager (DDR AUX P) (or the primary deep sleep entity (ARC P)) may determine that the resources used by the primary DDR memory are idle, not used, or beneath a threshold amount. The primary DDR memory manager (DDR AUX P) may send commands to the primary DDR memory to transition the primary DDR memory to a self-refresh state, and optionally receive a confirmation message from the primary DDR memory (or a memory controller thereof) that the primary DDR memory is in the self-refresh state.

At 915, the primary DDR memory manager (DDR AUX P) sends a trigger to the primary deep sleep entity (DS ARC P). For example, the primary DDR memory manager (DDR AUX P) sends a trigger message or indication to the primary deep sleep entity (DS ARC P) indicating that the corresponding DDR memories of the SoC (e.g., at least the primary DDR memory) are in the low-power or self-refresh mode. In some implementations, the primary DDR memory manager (DDR AUX P) sends a vote indication for deep sleep entry to the primary deep sleep entity (DS ARC P). The vote indication may be one-part of the evaluation by the primary deep sleep entity (DS ARC P) to enter the deep sleep state and begin deep sleep entry or deep sleep transition operations, as described further with reference to 935.

At 920, the primary deep sleep entity (DS ARC P) receives indications from a plurality of first clients of the primary chiplet or die for deep sleep entity. For example, each client of the plurality of first clients may vote for deep sleep entry or indicate that they are idle or otherwise able to be put to deep sleep. To illustrate, each client may send a message or vote to the primary deep sleep entity (DS ARC P) which aggregates the votes, such as by deep sleep entity (DS) thereof. In other implementations, each client may provide an indication to a separate entity from the primary deep sleep entity (DS ARC P), which aggregates the votes and sends a trigger to the primary deep sleep entity (DS ARC P).

At 925, the secondary deep sleep entity (DS ARC S) receives indications from a plurality of second clients of the secondary chiplet or die for deep sleep entity. For example, each client of the plurality of second clients may vote for deep sleep entry or indicate that they are idle or otherwise able to be put to deep sleep. To illustrate, each client may send a message or vote to the secondary deep sleep entity (DS ARC S) which aggregates the votes, such as by deep sleep entity (DS) thereof. In other implementations, each client may provide an indication to a separate entity from the secondary deep sleep entity (DS ARC S), which aggregates the votes and sends a trigger to the secondary deep sleep entity (DS ARC S).

At 930, the secondary deep sleep entity (DS ARC S) sends an indication to the primary deep sleep entity (DS ARC P) for deep sleep entry. For example, the secondary deep sleep entity (DS ARC S) sends an indication to the primary deep sleep entity (DS ARC P) across the D2D interface voting for deep sleep entry or indicating the second chiplet/die is read for deep sleep entry. To illustrate, the secondary deep sleep entity (DS ARC S) sends the aggregated votes to the primary deep sleep entity (DS ARC P) for deep sleep entry, such as for determining whether to perform deep sleep entry/transition operations.

At 935, the primary deep sleep entity (DS ARC P) determines to enable deep sleep. For example, the primary deep sleep entity (DS ARC P) performs one or more determinations to determine whether or not to enter the deep sleep mode or state, such as to perform deep sleep entry/transition operations. To illustrate, the primary deep sleep entity (DS ARC P) determines to enter the deep sleep mode based on a state of the DDR memory and based on a state of the clients of the first and second dies/of the primary and secondary chiplets. As an illustrative example, the primary deep sleep entity (DS ARC P) determines to enter the deep sleep mode based on the indication from the primary DDR memory manager (DDR AUX P) indicating that the DDR memories are in the self-refresh state and based on the vote indications from the first and second clients indicating votes for the deep sleep state. In some implementations, each client of the primary and secondary chiplets has to vote for deep sleep. In other implementations, a majority or other threshold may be used, such as 60, 75, 80, 90, or 95 percent of all clients voting for deep sleep, as illustrative, non-limiting examples.

At 940, the primary deep sleep entity (DS ARC P) sends a deep sleep enable trigger to the primary deep sleep enable logic (DS Enable Logic P) to enable deep sleep entry/transition for the primary chiplet/die. For example, the primary deep sleep entity (DS ARC P) sends a deep sleep enable trigger to the primary deep sleep enable logic (DS Enable Logic P) to enable deep sleep entry/transition for the primary chiplet/die based on and/or responsive to determining to enter the deep sleep mode at 935.

At 945, the primary deep sleep entity (DS ARC P) sends a deep sleep indication to the primary sleep hardening logic (AWSM P) to trigger a deep sleep event for SoC. For example, the primary deep sleep entity (DS ARC P) sends a deep sleep branch event trigger message to the primary sleep hardening logic (AWSM P) to trigger deep sleep hardening operations across the chiplets of the SoC based on and/or responsive to determining to enter the deep sleep mode at 935, or the sending of the deep sleep enable trigger to the primary deep sleep enable logic (DS Enable Logic P) at 940.

At 950, the primary sleep hardening logic (AWSM P) performs sleep hardening operations for the primary chiplet/die. For example, the primary sleep hardening logic (AWSM P) prepares subsystems of the primary chiplet/die for deep sleep transition. To illustrate, the primary sleep hardening logic (AWSM P) executes a deep sleep sequence. The deep sleep sequence may transition subsystems of the primary chiplet/die to a state that is prepared (e.g., "hardened") for deep sleep, such as ready for collapse of power rails/ disconnection from power.

At 955, the secondary sleep hardening logic (AWSM S) performs sleep hardening operations for the secondary chiplet/die, such as described with reference to FIG. 5 or 7. For example, the secondary sleep hardening logic (AWSM S) prepares subsystems of the secondary chiplet/die for deep sleep transition based on and responsive to the sleep hardening coordination operations at 950. To illustrate, the secondary sleep hardening logic (AWSM S) executes a deep sleep sequence responsive to receiving a sleep hardening trigger from the primary sleep hardening logic (AWSM P). The deep sleep sequence may transition subsystems of the secondary chiplet/die to a state that is prepared (e.g., "hardened") for deep sleep.

At 960, the primary sleep hardening logic (AWSM P) coordinates sleep hardening operations for other chiplets/ dies of the SoC. For example, the primary sleep hardening logic (AWSM P) and the secondary sleep hardening logic (AWSM S) perform chiplet subsystem sleep hardening coordination operations. For example, the primary sleep hardening logic (AWSM P) and the secondary sleep hardening logic (AWSM S) exchange messages across the D2D interface to coordinate transitioning their corresponding subsystems to a sleep hardened state and/or for confirmation of completion of transitioning their corresponding subsystems to a sleep hardened state.

At 965, the primary sleep hardening logic (AWSM P) sends a trigger indication to the PMIC. For example, the primary sleep hardening logic (AWSM P) sends a trigger message to the PMIC to trigger a DS PBS of the PMIC based on and/or responsive to performing the sleep hardening operations for the primary chiplet/die at 950. In some implementations, the trigger message to the PMIC is sent by the primary sleep hardening logic (AWSM P) after coordination with and/or confirmation from the other chiplets of completion of sleep hardening operations. The DS PBS of the PMIC(s) may include a series of operations which collapses power rails or transitions the power rails to a low power or retention state.

Figure 10:
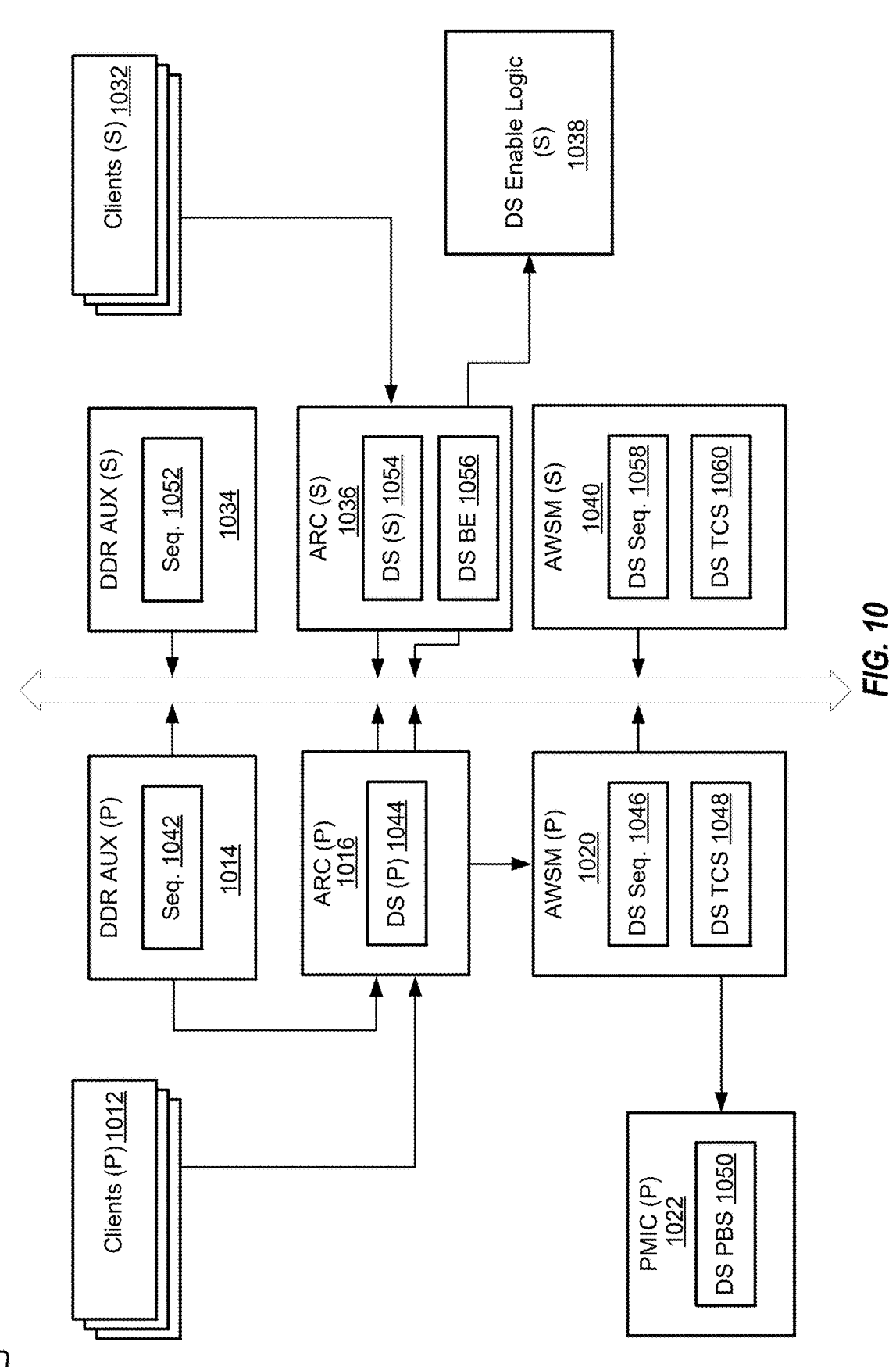
FIG. 10 is a block diagram illustrating an example of an enhanced deep sleep architecture for multiple chip SoCs according to some aspects of the disclosure.

Referring to FIG. 10, FIG. 10 is an example of an SoC architecture with heterogenous chiplets and a secondary-only DDR configuration. In FIG. 10, an SoC 1000 that is configured for enhanced deep sleep operations is illustrated.

The SoC 1000 includes multiple chiplet or dies. In the example of FIG. 10, two chiplets and dies are illustrated for simplicity, that is a first chiplet on a first die and a second chiplet on a second die connected to each other via die-to-die (D2D) interface and where the chiplets are not the same type, as described with reference to FIG. 3D. In other examples, the SoC 1000 may include more chiplets of the primary/first type, the secondary/second type, or of a different type. In the particular example illustrated in FIG. 10, the SoC 1000 includes a primary chiplet on a primary die and a secondary chiplet on a secondary die with at least one different subsystem or component.

The SoC 1000 includes similar subsystems and components described with reference to the SoC of FIG. 2, the SoC 400 of FIG. 4, the SoC 600 of FIG. 6, and/or the SoC 800 of FIG. 8. For example, the primary chiplet of the SoC 1000 includes a first plurality of clients 1012 (clients P), a first DDR AUX 1014 (DDR AUX P), a first ARC 1016 (ARC P), first AOSS logic 1020 (AWSM P), and a PMIC 1022 (PMIC P). The secondary chiplet of the SoC 1000 includes a second plurality of clients 1032 (clients S), a second DDR AUX 1034 (DDR AUX S), a second ARC 1036 (ARC S), deep sleep enable logic 1038 (DS enable logic S), and second AOSS logic 1040 (AWSM S).

The first plurality of clients 1012 (e.g., first clients) may include or correspond to the plurality of clients 212 of FIG. 2 and/or any of the first plurality of clients 412, 612, 812 of FIG. 4, 6, or 8. The first DDR AUX 1014 (DDR AUX P) may include or correspond to the DDR AUX 214 of FIG. 2, the first DDR AUX 414 of FIG. 4, the first DDR AUX 614 of FIG. 6, and/or the first DDR AUX 814 of FIG. 8. The first DDR AUX 1014 may include a sequencer 1042, and the sequencer 1042 may include or correspond to the sequencer 232 of FIG. 2, the sequencer 442 of FIG. 4, the sequencer 642 of FIG. 6, and/or the sequencer 842 of FIG. 8.

As compared to the examples of FIGS. 4, 6, and 8, the SoC 1000 of FIG. 10 does not include a DDR memory on the primary chiplet. In the example of FIG. 10, the first DDR AUX 1014 (DDR AUX P) of the SoC 1000 performs deep sleep coordination operations with the other chiplets, such as with corresponding DDR AUXs thereof. However, the first DDR AUX 1014 (DDR AUX P) of the SoC 1000 is not configured to transition a DDR memory on the primary chiplet to a self-refresh state. Rather, the first DDR AUX 1014 (DDR AUX P) of the SoC 1000 receives indications from other DDR AUX components of other chiplets/dies regarding their corresponding DDR memories, and the first DDR AUX 1014 relays the states of the DDR memories to the first ARC 1016 to enable a determination to transition to the deep sleep state.

The first ARC 1016 (ARC P) may include or correspond to the ARC 216 of FIG. 2, the first ARC 416 (ARC P) of FIG. 4, the first ARC 616 (ARC P) of FIG. 6, and/or the first ARC 816 (ARC P) of FIG. 8. The first ARC 1016 (ARC P) may include a first deep sleep entity 1044 (DS P), and the first deep sleep entity 1044 (DS P) may include or correspond to the deep sleep entity 242 of FIG. 2, the first deep sleep entity 444 of FIG. 4, the first deep sleep entity 604 of FIG. 6, and/or the first deep sleep entity 844 of FIG. 8.

As compared to the examples of FIGS. 4, 6, and 8, the SoC 1000 of FIG. 10 does not include a deep sleep enable logic component on the primary chiplet. In the example of FIG. 10, the deep sleep enable logic 1038 of the secondary chiplet of the SoC 1000 performs the deep sleep enable operations for each of the chiplets or the entire SoC 1000, and the first ARC 1016 (ARC P) is configured to trigger the deep sleep enable logic 1038 of the secondary chiplet via the second ARC 1036 (ARC S).

The first AOSS logic 1020 (AWSM P) may include or correspond to the AOSS sleep hardening logic 220 of FIG. 2, the first AOSS logic 420 of FIG. 4, the first AOSS logic 620 of FIG. 6, and/or the first AOSS logic 820 of FIG. 8. The first AOSS logic 1020 (AWSM P) may include a first deep sleep sequencer 1046 (DS Seq.) and a first DS TCS 1048. The first deep sleep sequencer 1046 may include or correspond to the DS Seq. 252 of FIG. 2, the first deep sleep sequencer 446 of FIG. 4, the first deep sleep sequencer 646 of FIG. 6, and/or the first deep sleep sequencer 746 of FIG. 7, and the first DS TCS 1048 may include or correspond to the DS TCS 255 of FIG. 2, first DS TCS 448 of FIG. 4, first DS TCS 648 of FIG. 6, and/or the first DS TCS 848 of FIG. 8.

The PMIC 1022 (PMIC P) may include or correspond to the PMIC 222 of FIG. 2, the PMIC 422 of FIG. 4, the PMIC 622 of FIG. 6, and/or the PMIC 822 of FIG. 8. The PMIC 1022 (PMIC P) may include a deep sleep programable boot sequence (DS PBS) 1050, and the DS PBS 1050 may include or correspond to the DS PBS 262 of FIG. 2, the DS PBS 450 of FIG. 4, the DS PBS 650 of FIG. 6, and/or the DS PBS 850 of FIG. 8.

Although the first DDR AUX 1014, the first ARC 1016 (ARC P), and the first AOSS logic 1020 (AWSM P) are illustrated as separate components, in some implementations two or more of the first DDR AUX 1014, the first ARC 1016 (ARC P), and the first AOSS logic 1020 (AWSM P) are unitary or part of the same component. Each of the first DDR AUX 1014, the first ARC 1016 (ARC P), and the first AOSS logic 1020 (AWSM P) may be referred to generally as deep sleep logic or components.

The second plurality of clients 1032 (e.g., second clients) may include or correspond to the plurality of clients 212 of FIG. 2 and/or the first plurality of clients 1012. The second DDR AUX 1034 (DDR AUX S) may include or correspond to DDR AUX 214 of FIG. 2 and/or the first DDR AUX 1014 (DDR AUX P), as described above. The second DDR AUX 1034 (DDR AUX S) may include a second sequencer 1052. The second sequencer 1052 may include or correspond to the sequencer 232 of FIG. 2 or the sequencer 1042. In the example of FIG. 10, the second DDR AUX 1034, such as the second sequencer 1052 thereof, is configured to vote or otherwise indicate to the SoC 1000, such as to the second ARC 1036, that the second DDR memory is in or is able to enter a low power or sleep state, such as a refresh state or mode.

Similar to the example of FIG. 4 where the second DDR AUX 434 communicates across the D2D interface with the first DDR AUX 414 to provide the indication that the second DDR memory is in the self-refresh mode and/or the vote for deep sleep, in the example of FIG. 10, the second DDR AUX 1034 communicates across the D2D interface with the first DDR AUX 1014 to provide an indication that the second DDR memory is in the self-refresh mode and/or an indication of a vote for deep sleep.

The second ARC 1036 (ARC S) may include or correspond to the ARC 216 of FIG. 2 and/or the first ARC 1016 (ARC P), as described above. The second ARC 1036 (ARC S) may include a second deep sleep entity 1054 (DS S) and a deep sleep backend entity 1056 (DS BE). The second deep sleep entity 1054 (DS S) may include or correspond to the deep sleep entity 242 of FIG. 2 and/or the first deep sleep entity 1044 (DS P) as described above. The deep sleep backend entity 1056 (DS BE) may include or correspond to the deep sleep backend entity 456 (DS BE) of FIG. 4 or the deep sleep backend entity 656 (DS BE) of FIG. 6.

The second deep sleep enable logic 1038 (DS enable logic S) may include or correspond to the deep sleep enable logic 218 of FIG. 2 and/or the second deep sleep enable logic 438 (DS enable logic S) of FIG. 4, the second deep sleep enable logic 638 (DS enable logic S) of FIG. 6, and/or the deep sleep enable logic 838 (DS enable logic P) of FIG. 8.

The second AOSS logic 1040 (AWSM S) may include or correspond to the AOSS sleep hardening logic 220 of FIG. 2 and/or the first AOSS logic 1020 (AWSM P), as described above. The second AOSS logic 1040 (AWSM S) may include a second deep sleep sequencer 1058 (DS Seq.) and a second DS TCS 1060. The second deep sleep sequencer 1058 may include or correspond to the DS Seq. 252 of FIG. 2 and/or the first deep sleep sequencer 1046 as described above. The second DS TCS 1060 may include or correspond to the DS TCS 255 of FIG. 2 and/or the first DS TCS 1048, as described above.

In the example of FIG. 10, the components of the first DDR AUX 1014, the first ARC 1016, the first AOSS logic 1020, and the second AOSS logic 1040 may include or correspond to local resources. For example, the first deep sleep entity 1044 may include or correspond to a local resource of the primary chiplet/die, and the second deep sleep sequencer 1058 may include or correspond to a local resource of the secondary chiplet/die.

Additionally, the components of the second DDR AUX 1034 and the second ARC 1036 may include or correspond to remote or backend resources. For example, the second deep sleep entity 1054 of the second ARC 1036 may include or correspond to a remote resource of the primary chiplet/die and located on the secondary chiplet/die. As another example, the second sequencer 1052 of the second DDR AUX 1034 and the deep sleep backend entity 1056 of the second ARC 1036 may include or correspond to a backend resource.

As compared to the SoC 800 of FIG. 8, the SoC 1000 of FIG. 10 does not include a deep sleep enable logic on the primary chiplet or die which is configured to control deep sleep enable operations on the primary chiplet or die. The operations of the SoC 1000 of FIG. 10 are described with reference to FIG. 11.

Figure 11:
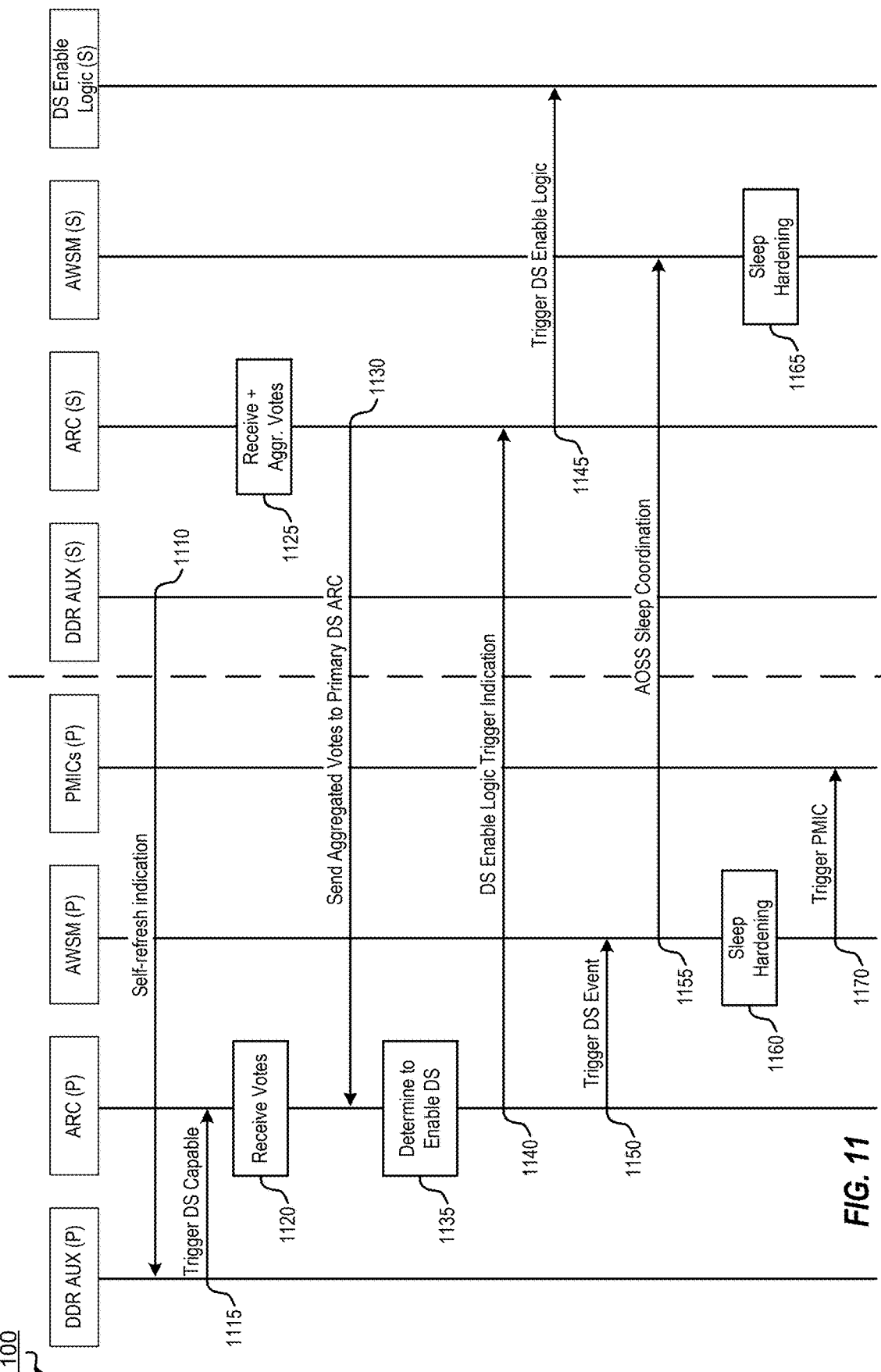
FIG. 11 is a flow diagram illustrating an example of enhanced deep sleep operations for multiple chip SoCs according to some aspects of the disclosure.

Referring to FIG. 11, FIG. 11 is an example of enhanced deep sleep operations for an SoC architecture with heterogenous chiplets and a secondary-only DDR configuration, such as the SoC 1000 of FIG. 10. In FIG. 11, a flow diagram of enhanced deep sleep operations is illustrated. As compared to the primary-only heterogenous examples of FIGS. 8 and 9, the secondary-only heterogenous examples of FIGS. 10 and 11 do not have a DDR memory on the first or primary chiplet.

During operation of the SoC 1000 of FIG. 10, at 1110, the secondary DDR memory manager (DDR AUX S) transmits a self-refresh or low-power mode indication to the primary DDR memory manager (DDR AUX P). For example, the primary DDR memory manager (DDR AUX P) and the secondary DDR memory manager (DDR AUX S) may coordinate with each other to perform DDR sleep coordination operations, similar to those described with reference to the DDR sleep coordination operations at 510 of FIG. 5. To illustrate, the DDR memory managers may exchange messages across the D2D interface to coordinate transitioning the DDR memory of the secondary chiplet or die to a low-power or self-refresh mode. The low-power or self-refresh mode of the DDR memory may correspond to state where the DDR memory has transfer, flushed, or placed its currently stored cache data (e.g., LLC) into the DDR memory and the DDR memory is not operating. In the low-power or self-refresh mode, the DDR memory may be receiving only retention power sufficient to sustain memory in the cache storage or may be fully disconnected from power.

The messages may include a synchronization message, a low power ready message, a low power transition or trigger message, a low power state confirmation message, or any combination thereof. In the example of FIG. 11, the secondary DDR memory manager (DDR AUX S) may have already determined that the secondary DDR memory is in a self-refresh state, or is capable of transitioning to a self-refresh state, as described with reference to the determination at 910 of FIG. 9. For example, the secondary DDR memory manager (DDR AUX S) may have already determined to transition the secondary DDR memory to the self-refresh state based on resource usage of the secondary DDR memory.

At 1115, the primary DDR memory manager (DDR AUX P) sends a trigger to the primary deep sleep entity (DS ARC P). For example, the primary DDR memory manager (DDR AUX P) sends a trigger message or indication to the primary deep sleep entity (DS ARC P) indicating that the corresponding DDR memories of the SoC (e.g., at least the secondary DDR memory) are in the low-power or self-refresh mode. In some implementations, the primary DDR memory manager (DDR AUX P) sends a vote indication for deep sleep entry to the primary deep sleep entity (DS ARC P). The vote indication may be one-part of the evaluation by the primary deep sleep entity (DS ARC P) to enter the deep sleep state and begin deep sleep entry or deep sleep transition operations, as described further with reference to 1135.

In other implementations, the above self-refresh or low-power mode indication at 1110 may be transmitted directly to the secondary deep sleep entity (DS ARC S) from the secondary DDR memory manager (DDR AUX S), and the primary DDR memory manager DDR_AUX (P) may be optional or not present. In such implementations, the trigger to the primary deep sleep entity (DS ARC P) at 1115 would be replaced with a trigger from the secondary DDR memory manager DDR_AUX (S) to the secondary deep sleep entity (DS ARC S).

At 1120, the primary deep sleep entity (DS ARC P) receives indications from a plurality of first clients of the primary chiplet or die for deep sleep entity. For example, each client of the plurality of first clients may vote for deep sleep entry or indicate that they are idle or otherwise able to be put to deep sleep. To illustrate, each client may send a message or vote to the primary deep sleep entity (DS ARC P) which aggregates the votes, such as by deep sleep entity (DS) thereof. In other implementations, each client may provide an indication to separate entity which aggregates the votes and sends a trigger to the primary deep sleep entity (DS ARC P).

At 1125, the secondary deep sleep entity (DS ARC S) receives indications from a plurality of second clients of the secondary chiplet or die for deep sleep entity. For example, each client of the plurality of second clients may vote for deep sleep entry or indicate that they are idle or otherwise able to be put to deep sleep. To illustrate, each client may send a message or vote to the secondary deep sleep entity (DS ARC S) which aggregates the votes, such as by deep sleep entity (DS) thereof. In other implementations, each client may provide an indication to separate entity which aggregates the votes and sends a trigger to the secondary deep sleep entity (DS ARC S).

At 1130, the secondary deep sleep entity (DS ARC S) sends an indication to the primary deep sleep entity (DS ARC P) for deep sleep entry. For example, the secondary deep sleep entity (DS ARC S) sends an indication to the primary deep sleep entity (DS ARC P) across the D2D interface voting for deep sleep entry or indicating the second chiplet/die is read for deep sleep entry. To illustrate, the secondary deep sleep entity (DS ARC S) sends the aggregated votes to the primary deep sleep entity (DS ARC P) for deep sleep entry, such as for determining whether to perform deep sleep entry/transition operations.

At 1135, the primary deep sleep entity (DS ARC P) determines to enable deep sleep. For example, the primary deep sleep entity (DS ARC P) performs one or more determinations to determine whether or not to enter the deep sleep mode or state, such as to perform deep sleep entry/transition operations. To illustrate, the primary deep sleep entity (DS ARC P) determines to enter the deep sleep mode based on a state of the DDR memory and based on a state of the clients of the first and second dies/of the primary and secondary chiplets. As an illustrative example, the primary deep sleep entity (DS ARC P) determines to enter the deep sleep mode based on the indication from the primary DDR memory manager (DDR AUX P) indicating that the DDR memories are in the self-refresh state and based on the vote indications from the first and second clients indicating votes for the deep sleep state. In some implementations, each client of the primary and secondary chiplets has to vote for deep sleep. In other implementations, a majority or other threshold may be used, such as 60, 75, 80, 90, or 95 percent of all clients voting for deep sleep, as illustrative, non-limiting examples.

At 1140, the primary deep sleep entity (DS ARC P) sends a deep sleep enable trigger to the secondary deep sleep entity (DS ARC S) to coordinate deep sleep entry/transition for the SoC. For example, the primary deep sleep entity (DS ARC P) sends a deep sleep enable trigger message or indication to the secondary deep sleep entity (DS ARC S) across the D2D communication interface indicating that the primary deep sleep entity (DS ARC P) has determined that the conditions for entering deep sleep have been satisfied and that the primary deep sleep entity (DS ARC P) has determined to enter the deep sleep mode. The deep sleep enable trigger message or indication may include or correspond to a deep sleep enable logic trigger indication, which coordinates triggering of the deep sleep enable logic on other chiplets or dies.

At 1145, the secondary deep sleep entity (DS ARC S) sends a deep sleep enable trigger to the secondary deep sleep enable logic (DS Enable Logic S) to enable deep sleep entry/transition for the secondary chiplet/die. For example, the secondary deep sleep entity (DS ARC S) sends a deep sleep enable trigger to the secondary deep sleep enable logic (DS Enable Logic S) to enable deep sleep entry/transition for the secondary chiplet/die based on and/or responsive to receiving the deep sleep enable trigger from the primary deep sleep entity (DS ARC P) at 1140.

At 1150, the primary deep sleep entity (DS ARC P) sends a deep sleep indication to the primary sleep hardening logic (AWSM P) to trigger a deep sleep event for SoC. For example, the primary deep sleep entity (DS ARC P) sends a deep sleep branch event trigger message to the primary sleep hardening logic (AWSM P) to trigger deep sleep hardening operations across the chiplets of the SoC based on and/or responsive to determining to enter the deep sleep mode at 1135, or the sending of the deep sleep enable trigger to the secondary deep sleep entity (DS ARC S) at 1140.

At 1155, the primary sleep hardening logic (AWSM P) coordinates sleep hardening operations for other chiplets/dies of the SoC. For example, the primary sleep hardening logic (AWSM P) and the secondary sleep hardening logic (AWSM S) perform chiplet subsystem sleep hardening coordination operations. For example, the primary sleep hardening logic (AWSM P) and the secondary sleep hardening logic (AWSM S) exchange messages across the D2D interface to coordinate transitioning their corresponding subsystems to a sleep hardened state.

At 1160, the primary sleep hardening logic (AWSM P) performs sleep hardening operations for the primary chiplet/die. For example, the primary sleep hardening logic (AWSM P) prepares subsystems of the primary chiplet/die for deep sleep transition. To illustrate, the primary sleep hardening logic (AWSM P) executes a deep sleep sequence responsive to sleep coordination between the sleep hardening logic (AWSM P and ASWM S) at 1155. The deep sleep sequence may transition subsystems of the primary chiplet/die to a state that is prepared (e.g., "hardened") for deep sleep, such as ready for collapse of power rails/disconnection from power.

At 1165, the secondary sleep hardening logic (AWSM S) performs sleep hardening operations for the secondary chiplet/die, such as described with reference to FIG. 5 or 7. For example, the secondary sleep hardening logic (AWSM S) prepares subsystems of the secondary chiplet/die for deep sleep transition based on and responsive to the sleep hardening coordination operations at 1155. To illustrate, the secondary sleep hardening logic (AWSM S) executes a deep sleep sequence responsive to receiving a sleep hardening trigger from the primary sleep hardening logic (AWSM P). The deep sleep sequence may transition subsystems of the secondary chiplet/die to a state that is prepared (e.g., "hardened") for deep sleep.

At 1170, the primary sleep hardening logic (AWSM P) sends a trigger indication to the PMIC. For example, the primary sleep hardening logic (AWSM P) sends a trigger message to the PMIC to trigger a DS PBS of the PMIC based on and/or responsive to performing the sleep hardening operations for the primary chiplet/die at 1155. In some implementations, the trigger message to the PMIC is sent by the primary sleep hardening logic (AWSM P) after coordination with and/or confirmation from the other chiplets of completion of sleep hardening operations. The DS PBS of the PMIC(s) may include a series of operations which collapses power rails or transitions the power rails to a low power or retention state.

One or more portions of the example SoC architectures and/or one or more operations described with reference to FIGS. 4-11 may be combined with each other in other implementations. For example, the heterogenous chiplet SoC architectures may have chiplets which have ICHI DDR configurations or independent DDR configurations, and thus may perform one or more steps or operations as described with reference to FIGS. 5 and/or 7. To illustrate, the order of performance of AOSS sleep coordination, sleep hardening, and PMIC triggering may occur in any of the described orders in FIG. 5, 7, 9, or 11, for any of the SoC architectures described herein.

Referring to FIG. 12, FIG. 12 is a flow chart illustrating a method 1200 for enhanced deep sleep operations for multiple chip SoCs according to some embodiments of the disclosure. In some implementations, the method may be performed by any of the SoCs, and components thereof, of FIGS. 2-8. For example, the components of the SoCs of FIGS. 2-8 may perform enhanced deep sleep operations.

The method 1200 includes, at block 1202, receiving, at a first deep sleep entity of a first die from a second deep sleep entity of a second die, an indication for the secondary die to enter a deep sleep mode based on a plurality of votes from a plurality of clients of the second die. For example, the second deep sleep entity 454 of the second die receives a plurality of vote indications or messages from the plurality of second clients 432 and aggregates the votes. The second deep sleep entity 454 of the second die transmits a D2D message or indication to the first deep sleep entity 444 of the first die to indicate the second die is ready to enter the deep sleep mode after and based on aggregation of votes from the plurality of second clients 432 for deep sleep, as described with reference to FIGS. 4-8.

The first deep sleep entity may include or correspond to the DS entity 242 of FIG. 2, the first deep sleep entity 444 of FIG. 4, the first deep sleep entity 644 of FIG. 6, the first deep sleep entity 844 of FIG. 8, or the first deep sleep entity 1044 of FIG. 10. The second deep sleep entity may include or correspond to the DS entity 242 of FIG. 2, the second deep sleep entity 454 or the deep sleep backend entity 456 of FIG. 4, the second deep sleep entity 654 or the deep sleep backend entity 656 of FIG. 6, the second deep sleep entity 856 of FIG. 8, or the second deep sleep entity 1054 or the deep sleep backend entity 1056 of FIG. 10.

The first die may include or correspond to the die of the SoC of FIG. 2, any of the primary dies of FIGS. 3A-3D, or any of the primary dies/chiplets of FIGS. 4-10. The second die may include or correspond to the die of the SoC of FIG. 2, any of the secondary dies of FIGS. 3A-3D, or any of the secondary dies/chiplets of FIGS. 4-10.

The plurality of clients may include or correspond to the clients 212 of FIGS. 2, the clients 412 or 432 of FIG. 4, the clients 612 of 632 of FIG. 6, the clients 812 or 832 of FIG. 8, or the clients 1012 or 1032 of FIG. 10. The plurality of votes may include or correspond to votes or indications for deep sleep from the clients, and indicated by messages to the deep sleep entity.

At block 1204, the method 1200 includes triggering, by the first deep sleep entity, deep sleep enable logic based on the indication from the secondary die. For example, the first deep sleep entity 444 may trigger the deep sleep enable logic 418 based on an indication from the secondary die, as described with reference to FIGS. 4-8.

The triggering may include or correspond to intra-die communications, inter-die (e.g., D2D) communications, or both. For example, a primary deep sleep entity on a primary die may communicate with deep sleep enable logic on the primary die, on secondary dies, or both, to trigger deep sleep enable logic to perform deep sleep enable operations, as described with reference to FIGS. 2-10.

The deep sleep enable logic may include or correspond to the deep sleep enable logic 218 of FIG. 2, the first deep sleep enable logic 418 of FIG. 4, the deep sleep enable logic 618 of FIG. 6, the deep sleep enable logic 818 of FIG. 8, or the deep sleep enable logic 1038 of FIG. 10.

At block 1206, the method 1200 includes triggering, by the first deep sleep entity, a sleep hardening manager on the first die for AOSS deep sleep coordination between dies of the SoC based on the trigger from the first deep sleep entity. For example, the first deep sleep entity 444 of the first ARC 416 triggers the first AOSS logic 420 on the first die for AOSS deep sleep coordination between dies of the SoC responsive to receiving the indication from the second deep sleep entity and triggering the deep sleep enable logic, as described with reference to FIGS. 2-8. The determination to perform deep sleep entry and triggering may also be based on one or more other conditions or decisions at the first deep sleep entity.

The sleep hardening manager may include or correspond to the AOSS sleep hardening logic 220 of FIG. 2, the first AOSS logic 420 of FIG. 4, the first AOSS logic 620 of FIG. 6, the first AOSS logic 820 of FIG. 8, or the first AOSS logic 1020 of FIG. 10, or a component thereof.

The AOSS deep sleep coordination may include or correspond to the sleep hardening coordination between AOSS sleep hardening logic on different dies. For example, the communications between first AOSS sleep hardening logic (e.g., first AOSS logic 420, 620, 820, 1020) of a first die and second AOSS sleep hardening logic (e.g., second AOSS logic 440, 640, 840, 1040) of a second die, or components thereof (e.g., deep sleep sequencers (DS seq.), such as deep sleep sequencers 646 and 658).

The triggering may include or correspond to intra-die communications, such as messages on the primary die between components thereof. For example, a primary deep sleep entity on a primary die may communicate with AOSS sleep hardening logic (AWSM) (e.g., assert the DS branch event) on the primary die to trigger AOSS deep sleep coordination operations, as described with reference to FIGS. 2-10.

In a first aspect, a system-on-chip (SoC) includes at least one processor and a memory coupled to the at least one processor. The at least one processor is configured to cause the SoC to: receive, at a first deep sleep entity of a first die from a second deep sleep entity of a second die, an indication for the secondary die to enter a deep sleep mode based on a plurality of votes from a plurality of clients of the second die; trigger, by the first deep sleep entity, deep sleep enable logic based on an indication from the secondary die; and trigger, by the first deep sleep entity, a sleep hardening manager on the first die for AOSS deep sleep coordination between dies of the SoC based on the trigger from the first deep sleep entity.

In a second aspect, alone or in combination with the first aspect, the deep sleep mode corresponds to a sleep state where DDR memory of the SoC is in a self-refresh state and all SoC power rails are off. In some such aspects, the deep sleep mode corresponds to a sleep state that is deeper than a rock bottom sleep (RBS) state and has a quick boot wakeup ability and DDR memory retention.

In a third aspect, alone or in combination with one or more of the above aspects, the SoC has a homogeneous architecture, and wherein the SoC includes multiple die of a same type.

In a fourth aspect, alone or in combination with one or more of the above aspects, the homogeneous architecture has an inter-die/chipet hardware interleaving DDR configuration.

In a fifth aspect, alone or in combination with one or more of the above aspects, the homogeneous architecture has an independent DDR configuration (e.g., DDR memories on different die/chiplets work independent of one another).

In a sixth aspect, alone or in combination with one or more of the above aspects, the SoC has a heterogeneous architecture, and wherein the SoC includes multiple dies, including a first die of a first type and a second die of a second type different from the first type.

In a seventh aspect, alone or in combination with one or more of the above aspects, heterogeneous architecture has a primary die only DDR configuration.

In an eighth aspect, alone or in combination with one or more of the above aspects, the heterogeneous architecture has a secondary die only DDR configuration.

In a ninth aspect, alone or in combination with one or more of the above aspects, at least one processor is further configured to cause the SoC to: receive, at the deep sleep entity, a plurality of votes from a plurality of clients, each vote indicating whether or not to enter a deep sleep mode for the first die; receive, at the second deep sleep entity, a plurality of second votes from a plurality of second clients, each second vote indicating whether or not to enter a deep sleep mode for the second die; and receive, at the deep sleep entity from the second deep sleep entity, an indication (e.g., vote or vote indication) for the secondary die to enter the deep sleep mode based on the plurality of second votes (e.g., votes indicating for deep sleep).

In a tenth aspect, alone or in combination with one or more of the above aspects, at least one processor is further configured to cause the SoC to: determine, by a primary DDR manager (e.g., DDR AUX) of the first die and associated with a primary DDR memory of the first die, whether the primary DDR memory is in a self-refresh low power mode; coordinate, by a primary DDR manager with a secondary DDR manager (e.g., DDR AUX) of the second die, to vote to enter the deep sleep mode based on a determination that the primary DDR memory is in the self-refresh low power mode and on an indication from the secondary DDR manager to enter the deep sleep mode (e.g., the second DDR memory being in self-refresh mode or determined to enter self-refresh, or an indication for deep sleep); and send, from the primary DDR manager to the deep sleep entity, a vote indication to enter the deep sleep mode based on the determination that the DDR memory is in the self-refresh low power mode.

In an eleventh aspect, alone or in combination with one or more of the above aspects, at least one processor is further configured to cause the SoC to: send, by the deep sleep entity to the second deep sleep entity of the second die, a trigger message to indicate a transition to the deep sleep mode based on votes from first clients, an indication from the second deep sleep entity based on votes from second clients, and based on an indication from a primary DDR manager regarding DDR memory being in a self-refresh state.

In a twelfth aspect, alone or in combination with one or more of the above aspects, the at least one processor configured to cause the SoC to trigger, by the first deep sleep entity, the deep sleep enable logic includes to: send, by the deep sleep entity to the deep sleep enable logic, a trigger message to indicate the transition to the deep sleep mode based on the votes from the first clients, the indication from the second deep sleep entity based on the votes from the second clients, and based on the indication from the primary DDR manager; and wherein the at least one processor configured to cause the SoC to trigger, by the first deep sleep entity, the sleep hardening manager includes to: send, by the deep sleep entity to the sleep hardening manager, a trigger message to indicate a transition to a deep sleep based on the votes from the first clients, the indication from the second deep sleep entity based on the votes from the second clients, and based on the indication from the primary DDR manager.

In a thirteenth aspect, alone or in combination with one or more of the above aspects, the at least one processor is further configured to cause the SoC to: send, by the sleep hardening manager of the first die to a second sleep hardening manager of the second die, a trigger message to initiate a deep sleep sequence and perform sleep hardening on subsystems of the second die responsive to a trigger message from the first deep sleep entity; perform, by the sleep hardening manager, sleep hardening on subsystems of the first die; and perform, by the second sleep hardening manager, sleep hardening on subsystems of the second die.

In a fourteenth aspect, alone or in combination with one or more of the above aspects, the at least one processor is further configured to cause the SoC to: receive, at the sleep hardening manager of the first die from a second sleep hardening manager of the second die, an indication of sleep hardening completion for the second die; and send, by the sleep hardening manager to a PMIC of the SoC, a trigger message to perform deep sleep sequence (e.g., DS PBS operations) based on receipt of the indication of sleep hardening completion for the second die from the second sleep hardening manager.

In a sixteenth aspect, alone or in combination with one or more of the above aspects, the deep sleep enable logic is on the first die, and wherein the at least one processor is configured to cause the SoC to trigger the deep sleep enable logic include to: send, by the deep sleep entity to the second deep sleep entity, a deep sleep enable trigger notification; send, by the deep sleep entity to the deep sleep enable logic, a deep sleep enable trigger configured to cause the deep sleep enable logic to perform deep sleep enabling operations for the first die; and send, by the second deep sleep entity to a second deep sleep enable logic, a deep sleep enable trigger configured to cause the second deep sleep enable logic to perform deep sleep enabling operations for the second die and responsive to receipt of the deep sleep enable trigger notification.

In a seventeenth aspect, alone or in combination with one or more of the above aspects, the at least one processor is further configured to cause the SoC to: receive, by a second DDR manager, an indication of a second DDR memory of the second die being in a self-refresh mode; send, by the second DDR manager to a second deep sleep entity, a vote indication for a deep sleep mode for the second die; and send, by the second deep sleep entity to the first deep sleep entity, a vote indication for the deep sleep mode for the second die based on the vote indication from the second DDR manager.

In an eighteenth aspect, alone or in combination with one or more of the above aspects, deep sleep enable logic is on the first die, and wherein the at least one processor is configured to cause the SoC to trigger the deep sleep enable logic include to: send, by the deep sleep entity to the deep sleep enable logic, a deep sleep enable trigger configured to cause the deep sleep enable logic to perform deep sleep enabling operations for the first die and the second die.

In a nineteenth aspect, alone or in combination with one or more of the above aspects, the deep sleep enable logic is on the second die, and wherein the at least one processor is configured to cause the SoC to trigger the deep sleep enable logic include to: send, by the deep sleep entity to the second deep sleep entity, a deep sleep enable trigger notification; and send, by the second deep sleep entity to the deep sleep enable logic, a deep sleep enable trigger configured to cause the deep sleep enable logic to perform deep sleep enabling operations and responsive to receipt of the deep sleep enable trigger notification.

In a twentieth aspect, alone or in combination with one or more of the above aspects, the first die is associated with a primary chiplet of the SoC and the second die is associated with a secondary chiplet of the SoC.

In a twenty-first aspect, alone or in combination with one or more of the above aspects, the deep sleep entity is part of a first deep sleep container (e.g., DS ARC), wherein the second deep sleep entity is part of a second deep sleep container, and wherein the second deep sleep container further includes a back end deep sleep entity.

In another aspect, method for enhanced deep sleep for a system-on-chip (SoC) includes: receiving, at a first deep sleep entity of a first die from a second deep sleep entity of a second die, an indication for the secondary die to enter a deep sleep mode based on a plurality of votes from a plurality of clients of the second die; triggering, by the first deep sleep entity, deep sleep enable logic based on the indication from the secondary die; and triggering, by the first deep sleep entity, a sleep hardening manager on the first die for AOSS deep sleep coordination between dies of the SoC based on the trigger from the first deep sleep entity.

In an additional aspect, a system-on-chip (SoC) includes at least one processor and a memory (e.g., at least one memory) coupled to the at least one processor. The at least one processor is configured to cause the SoC to: receive, at a first deep sleep entity of a first die from a second deep sleep entity of a second die, an indication for the secondary die to enter a deep sleep mode based on a plurality of votes from a plurality of clients of the second die; trigger, by the first deep sleep entity, deep sleep enable logic based on an indication from the secondary die; trigger, by the first deep sleep entity, a sleep hardening manager on the first die for AOSS deep sleep coordination between dies of the SoC based on the trigger from the first deep sleep entity; send, by at the sleep hardening manager of the first die to a second sleep hardening manager of the second die, an indication to perform sleep hardening for the second die; receive, at the sleep hardening manager of the first die from the second sleep hardening manager of the second die, an indication of sleep hardening completion for the second die; and send, by the sleep hardening manager to a PMIC of the SoC, a trigger message to perform deep sleep sequence based on receipt of the indication of sleep hardening completion for the second die from the second sleep hardening manager.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower" or "front" and "back" or "top" and "bottom" or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A system-on-chip (SoC), comprising:
at least one processor; and
a memory coupled to the at least one processor,
wherein the at least one processor is configured to cause the SoC to:
receive, at a first deep sleep entity of a first die from a second deep sleep entity of a second die, an indication for the second die to enter a deep sleep mode based on a plurality of votes from a plurality of clients of the second die;
trigger, by the first deep sleep entity, deep sleep enable logic based on the indication from the second die; and trigger, by the first deep sleep entity, a sleep hardening manager on the first die for AOSS deep sleep coordination between dies of the SoC based on the trigger from the first deep sleep entity.

2. The SoC of claim 1, wherein the deep sleep corresponds to a sleep state where DDR memory of the SoC is in a self-refresh state and all SoC power rails are off.

3. The SoC of claim 1, wherein the SoC has a homogeneous architecture, and wherein the SoC includes multiple die of a same type.

4. The SoC of claim 3, wherein the homogeneous architecture has an inter-die or chiplet hardware interleaving DDR configuration.

5. The SoC of claim 3, wherein the homogeneous architecture has an independent DDR configuration.

6. The SoC of claim 1, wherein the SoC has a heterogeneous architecture, and wherein the SoC includes multiple dies, including a first die of a first type and a second die of a second type different from the first type.

7. The SoC of claim 6, wherein the heterogeneous architecture has a primary die only DDR configuration, wherein the first die is the primary die.

8. The SoC of claim 6, wherein the heterogeneous architecture has a secondary die only DDR configuration, wherein the second die is the secondary die.

9. The SoC of claim 1, wherein the at least one processor is further configured to cause the SoC to:
receive, at the first deep sleep entity, a plurality of votes from a plurality of clients of the first die, each vote indicating whether or not to enter the deep sleep mode for the first die;
receive, at the second deep sleep entity, a plurality of second votes from a plurality of second clients, each second vote indicating whether or not to enter the deep sleep mode for the second die; and
receive, at the first deep sleep entity from the second deep sleep entity, an indication for the second die to enter the deep sleep mode based on the plurality of second votes.

10. The SoC of claim 1, wherein the at least one processor is further configured to cause the SoC to:
determine, by a primary DDR manager of the first die and associated with a primary DDR memory of the first die, whether the primary DDR memory is in a self-refresh low power mode;
coordinate, by the primary DDR manager with a secondary DDR manager of the second die, to vote to enter the deep sleep mode based on a determination that the primary DDR memory is in the self-refresh low power mode and on an indication from the secondary DDR manager to enter the deep sleep mode; and
send, from the primary DDR manager to the first deep sleep entity, a vote indication to enter the deep sleep mode based on the determination that the primary DDR memory is in the self-refresh low power mode.

11. The SoC of claim 1, wherein the at least one processor is further configured to cause the SoC to:
send, by the first deep sleep entity to the second deep sleep entity of the second die, a trigger message to indicate a transition to the deep sleep mode based on votes from first clients, an indication from the second deep sleep entity based on votes from second clients, and based on an indication from a primary DDR manager regarding DDR memory being in a self-refresh state.

12. The SoC of claim 11, wherein the at least one processor configured to cause the SoC to trigger, by the first deep sleep entity, the deep sleep enable logic includes to:

send, by the first deep sleep entity to the deep sleep enable logic, a trigger message to indicate the transition to the deep sleep mode based on the votes from the first clients, the indication from the second deep sleep entity based on the votes from the second clients, and based on the indication from the primary DDR manager; and wherein the at least one processor configured to cause the SoC to trigger, by the first deep sleep entity, the sleep hardening manager includes to:

send, by the first deep sleep entity to the sleep hardening manager, a trigger message to indicate a transition to a deep sleep based on the votes from the first clients, the indication from the second deep sleep entity based on the votes from the second clients, and based on the indication from the primary DDR manager.

13. The SoC of claim 1, wherein the at least one processor is further configured to cause the SoC to:

send, by the sleep hardening manager of the first die to a second sleep hardening manager of the second die, a trigger message to initiate a deep sleep sequence and perform sleep hardening on subsystems of the second die responsive to a trigger message from the first deep sleep entity;

perform, by the sleep hardening manager, sleep hardening on subsystems of the first die; and perform, by the second sleep hardening manager, sleep hardening on subsystems of the second die.

14. The SoC of claim 13, wherein the at least one processor is further configured to cause the SoC to:

receive, at the sleep hardening manager of the first die from the second sleep hardening manager of the second die, an indication of sleep hardening completion for the second die; and send, by the sleep hardening manager to a PMIC of the SoC, a trigger message to perform deep sleep sequence based on receipt of the indication of sleep hardening completion for the second die from the second sleep hardening manager.

15. The SoC of claim 1, wherein the deep sleep enable logic is on the first die, and wherein the at least one processor is configured to cause the SoC to trigger the deep sleep enable logic include to:

send, by the first deep sleep entity to the second deep sleep entity, a deep sleep enable trigger notification;

send, by the first deep sleep entity to the deep sleep enable logic, a deep sleep enable trigger configured to cause the deep sleep enable logic to perform deep sleep enabling operations for the first die; and send, by the second deep sleep entity to a second deep sleep enable logic, a deep sleep enable trigger configured to cause the second deep sleep enable logic to perform deep sleep enabling operations for the second die and responsive to receipt of the deep sleep enable trigger notification.

16. The SoC of claim 1, wherein the at least one processor is further configured to cause the SoC to:

receive, by a second DDR manager, an indication of a second DDR memory of the second die being in a self-refresh mode;

send, by the second DDR manager to the second deep sleep entity, a vote indication for the deep sleep mode for the second die; and send, by the second deep sleep entity to the first deep sleep entity, a vote indication for the deep sleep mode for the second die based on the vote indication from the second DDR manager.

17. The SoC of claim 1, wherein the deep sleep enable logic is on the first die, and wherein the at least one processor is configured to cause the SoC to trigger the deep sleep enable logic include to:

send, by the first deep sleep entity to the deep sleep enable logic, a deep sleep enable trigger configured to cause the deep sleep enable logic to perform deep sleep enabling operations for the first die and the second die.

18. The SoC of claim 1, wherein the deep sleep enable logic is on the second die, and wherein the at least one processor is configured to cause the SoC to trigger the deep sleep enable logic include to:

send, by the first deep sleep entity to the second deep sleep entity, a deep sleep enable trigger notification; and send, by the second deep sleep entity to the deep sleep enable logic, a deep sleep enable trigger configured to cause the deep sleep enable logic to perform deep sleep enabling operations and responsive to receipt of the deep sleep enable trigger notification.

19. A method for enhanced deep sleep for a system-on-chip (SoC), the method comprising:

receiving, at a first deep sleep entity of a first die from a second deep sleep entity of a second die, an indication for the second die to enter a deep sleep mode based on a plurality of votes from a plurality of clients of the second die;

triggering, by the first deep sleep entity, deep sleep enable logic based on the indication from the second die; and triggering, by the first deep sleep entity, a sleep hardening manager on the first die for AOSS deep sleep coordination between dies of the SoC based on the trigger from the first deep sleep entity.

20. A system-on-chip (SoC), comprising:

at least one processor; and a memory coupled to the at least one processor, wherein the at least one processor is configured to cause the SoC to:

receive, at a first deep sleep entity of a first die from a second deep sleep entity of a second die, an indication for the second die to enter a deep sleep mode based on a plurality of votes from a plurality of clients of the second die;

trigger, by the first deep sleep entity, deep sleep enable logic based on the indication from the second die;

trigger, by the first deep sleep entity, a sleep hardening manager on the first die for AOSS deep sleep coordination between dies of the SoC based on the trigger from the first deep sleep entity;

send, by at the sleep hardening manager of the first die to a second sleep hardening manager of the second die, an indication to perform sleep hardening for the second die;

receive, at the sleep hardening manager of the first die from the second sleep hardening manager of the second die, an indication of sleep hardening completion for the second die; and send, by the sleep hardening manager to a PMIC of the SoC, a trigger message to perform deep sleep sequence based on receipt of the indication of sleep hardening completion for the second die from the second sleep hardening manager.

* * * * *